United States Patent [19]
Schänzer et al.

[11] 3,911,436
[45] Oct. 7, 1975

[54] DEVICE FOR AIRCRAFT TRAJECTORY GUIDANCE

[75] Inventors: Günther Schänzer, Uberlingen (Bodensee); Hartmut Heiner Böhret, Uhldingen-Mulhofen, both of Germany

[73] Assignee: Bodenseewerk Geratetechnik GmbH, Uberlingen (Bodensee), Germany

[22] Filed: Aug. 23, 1974

[21] Appl. No.: 500,033

Related U.S. Application Data

[63] Continuation-in-part of Ser. No. 295,820, Oct. 10, 1972, abandoned.

[52] U.S. Cl. ......... 343/108 R; 235/150.22; 244/77 A
[51] Int. Cl.² ........................ G01S 1/16; G01S 1/18
[58] Field of Search ............ 343/108 R; 235/150.22; 244/77 A

[56] References Cited
UNITED STATES PATENTS

| | | | |
|---|---|---|---|
| 3,398,267 | 8/1968 | Hattendorf | 244/77 A |
| 3,588,477 | 6/1971 | Lami | 235/150.22 |
| 3,652,835 | 3/1972 | Devlin et al. | 244/77 A |
| 3,666,929 | 5/1972 | Menn | 244/77 A |
| 3,743,221 | 7/1973 | Lykken et al. | 235/150.22 |
| 3,776,455 | 12/1973 | Gee | 235/150.22 |

*Primary Examiner*—Maynard R. Wilbur
*Assistant Examiner*—T. M. Blum
*Attorney, Agent, or Firm*—Darbo, Robertson & Vandenburgh

[57] ABSTRACT

When approaching an airport at which there is a localizer and glide path transmitter, a localizer and glide path receiver supplies azimuth angle signals and elevation angle signals, and a distance measurement equipment identifying the position of an aircraft in polar coordinates. These signals are supplied to an aircraft trajectory computer which issues command signals for directing the flight of the aircraft to the airport along a path, at least portions of which are curved and not radial to the localizer and glide path transmitter. The apparatus produces a signal indicative of the deviation, in terms of lateral travel, of the aircraft from the commanded flight path.

17 Claims, 26 Drawing Figures

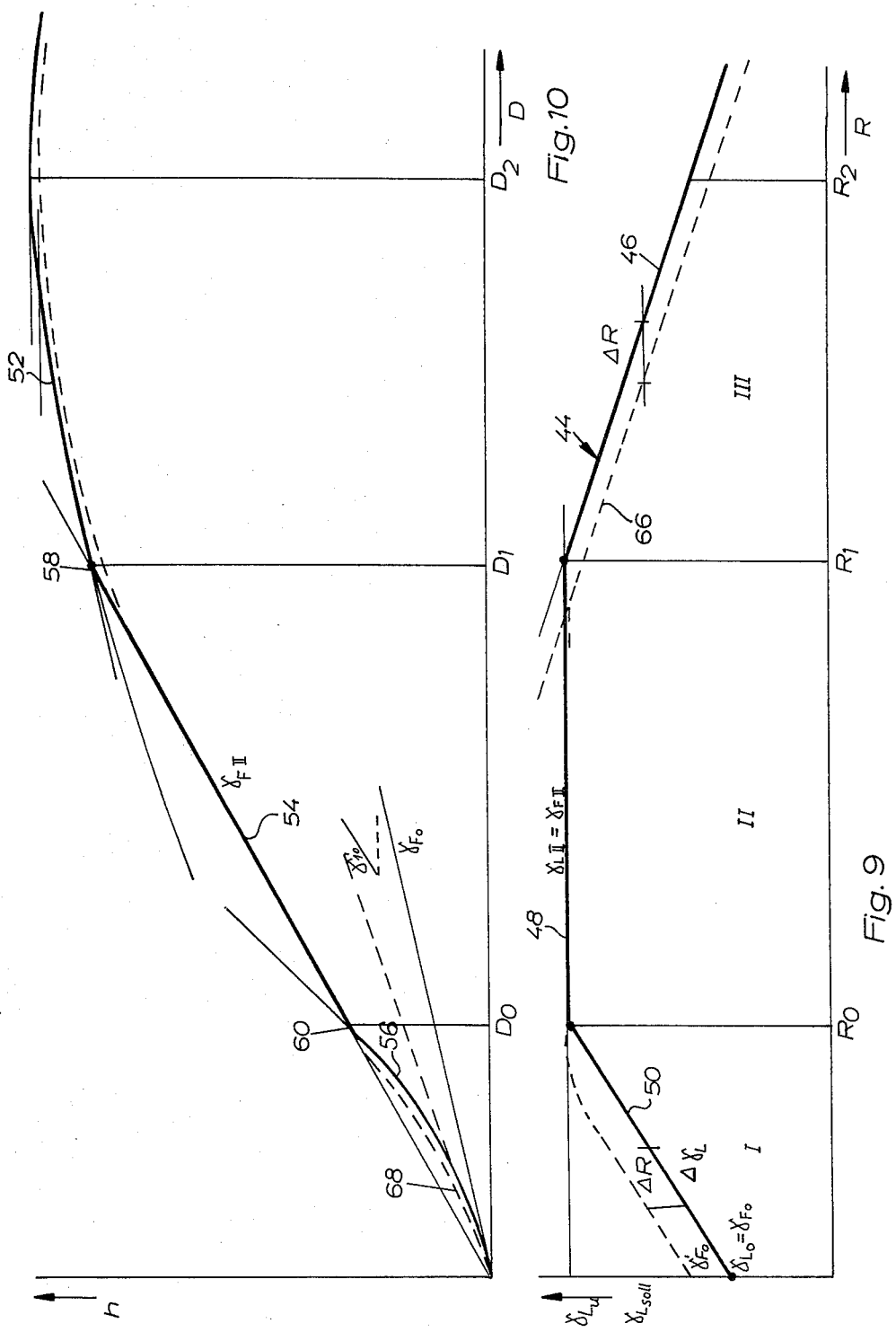

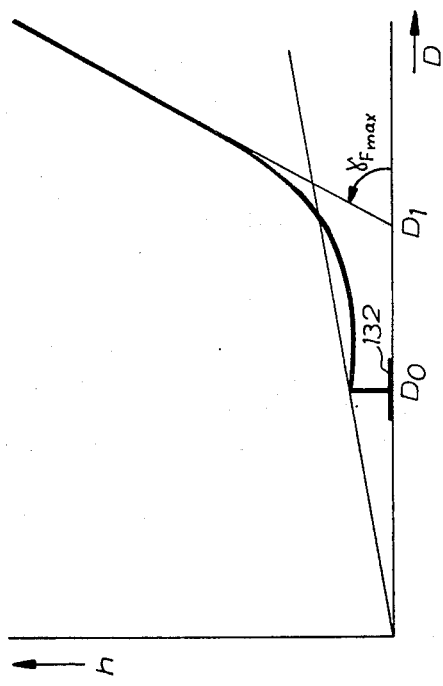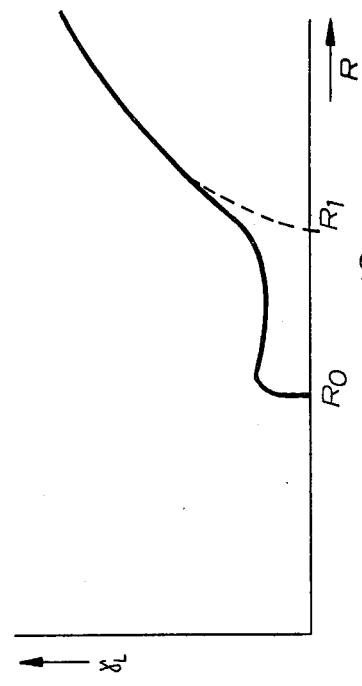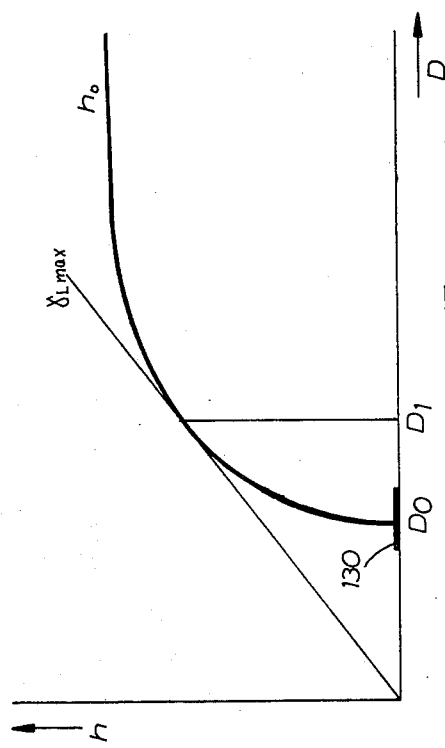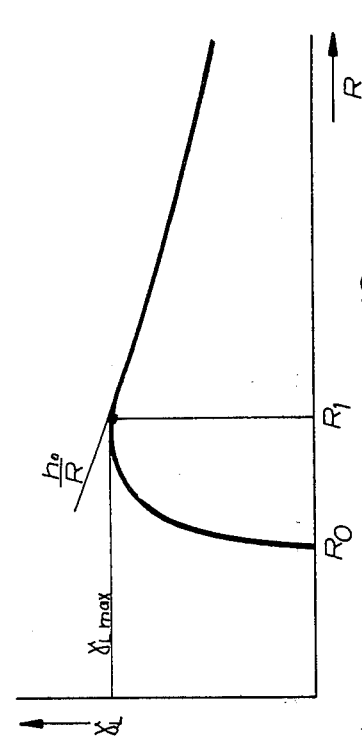

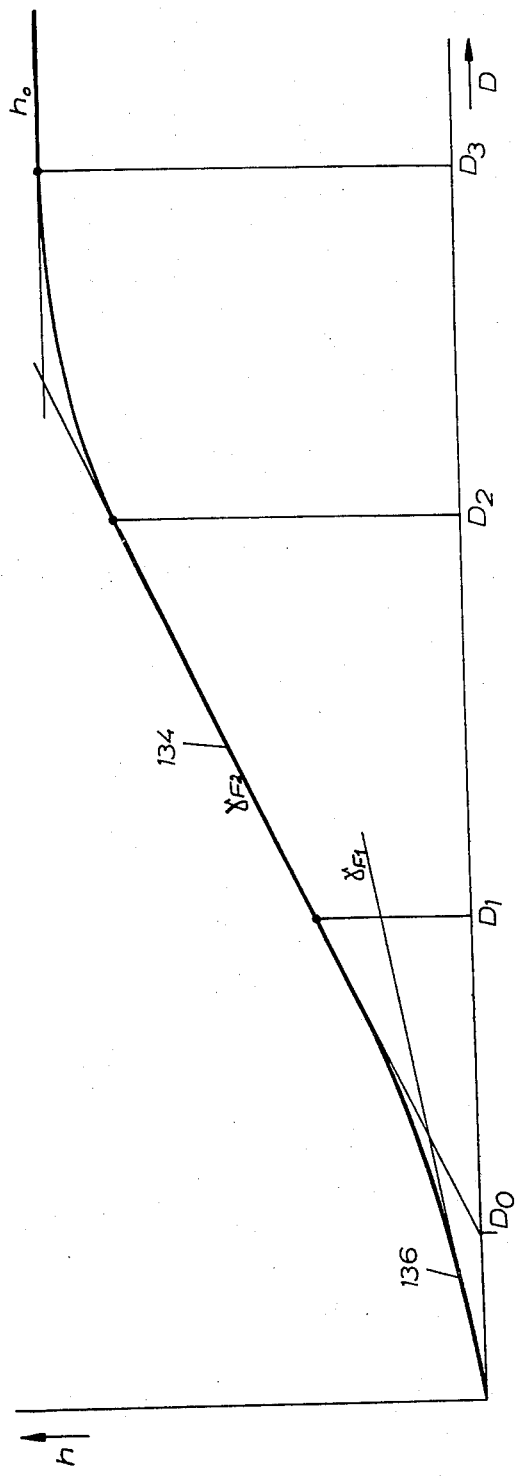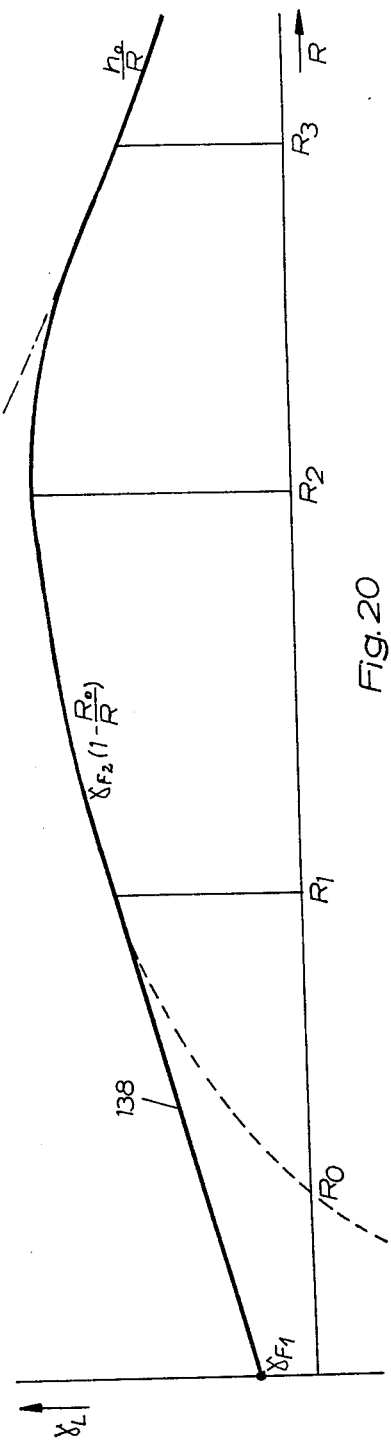
Fig.19
Fig.20

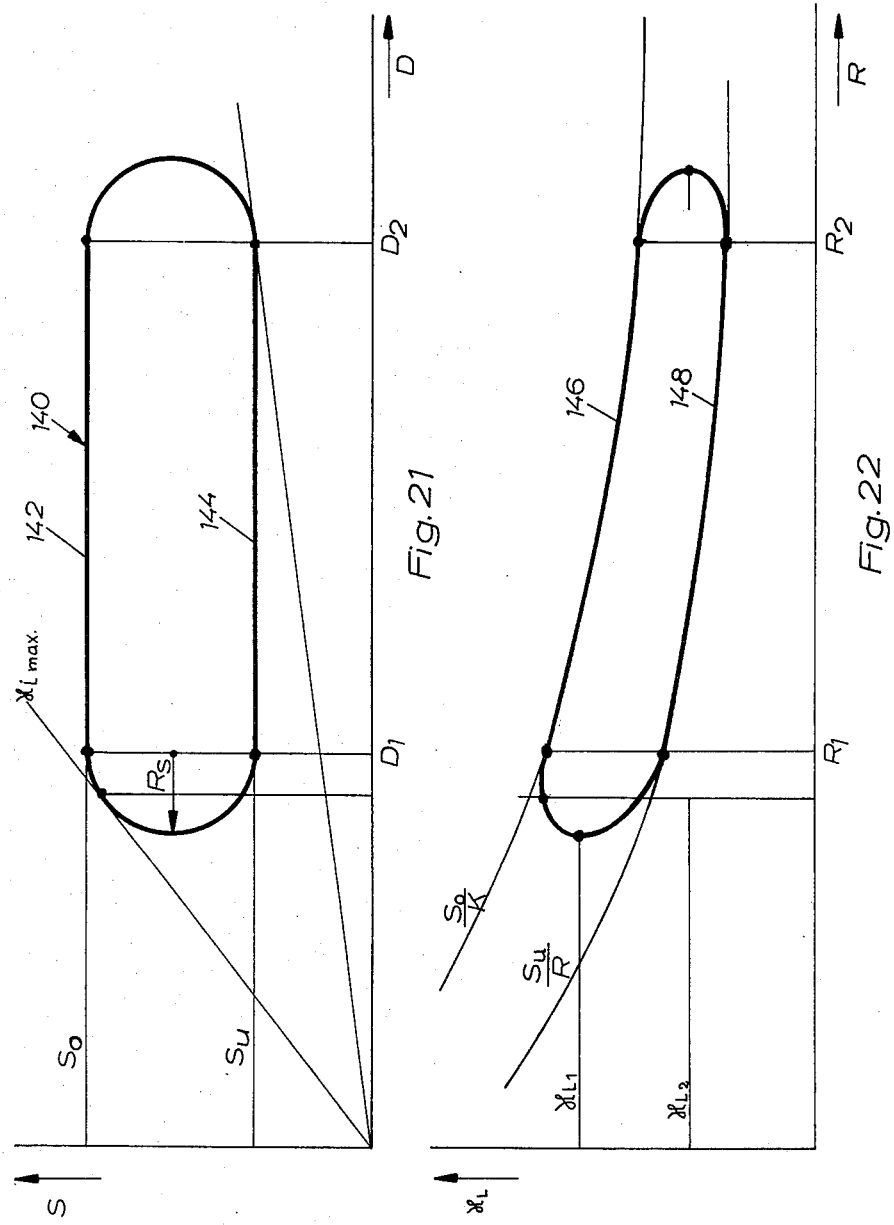

DEVICE FOR AIRCRAFT TRAJECTORY GUIDANCE

RELATED APPLICATION

This application is a continuation-in-part application of U.S. Pat. application Ser. No. 295,820 filed by us on Oct. 10, 1972, now abandoned for DEVICE FOR AIRCRAFT TRAJECTORY GUIDANCE, the disclosure of which is incorporated by reference.

BACKGROUND AND SUMMARY OF THE INVENTION

This invention relates to a device for directing the flight path of an aircraft by using a radio beam which supplies the aircraft position relative to a radio beacon in polar coordinates according to elevation, azimuth and slant distance.

Some prior art approach and landing systems supply to the pilot, or an automatic flight control system, azimuth, elevation and slant distance information relative to a radio beam system disposed on the runway (ILS). In a prior art method (TACAN) the localizer beam system includes a central vertical dipole emitting pulse-shaped signals. A cylinder, having a reflector arranged on a generatrix of it, rotates about this dipole at 15 cycles per second. Thereby, the signal emitted by the dipole in each direction is modulated at 15 cycles per second, the phase position of the modulation, however, being dependent on the direction. This modulation has superimposed thereon another modulation at 135 cycles per second for the fine angle indication by means of another cylinder having nine reflectors and also rotating at 15 cycles per second. An additional reference pulse is emitted to indicate when the maximum of the radiation is, for instance, exactly in the eastern direction. A device in the aircraft can determine the azimuth angle of the aircraft from the phase difference of the 15 cycles per second basic modulation relative to this reference pulse.

A similar result is achieved with another prior art system (SETAC), in which several dipoles for increasing the accuracy are arranged a spaced distance from each other. One dipole transmits at a carrier frequency $f_o$; a second dipole spaced therefrom at a distance of a wavelength $\lambda$ transmits at a frequency differing therefrom by 15 cycles per second; and a third dipole arranged at a distance 9 $\lambda$ transmits at $f_o + 135$ cycles per second. The result is similar in that a radiation pattern is produced which rotates at 15 cycles per second and which has superimposed thereon the 135 cycles per second modulation so that a modulation of the field strength, which depends on the azimuth angle, is obtained at the location of the aircraft. However, a specific phase angle has associated thereto a spatial angle smaller, for instance, by a factor 10 so that the determination of the azimuth position becomes substantially more precise.

The elevation measurement in the prior art system is effected by utilizing the Doppler effect. An antenna system is used which has a plurality of dipoles arranged in superposed and parallel relationships. By means of an antenna commutator, a frequency $f_o + f_h$ is successively supplied to the different dipoles at a frequency $f_s$ so that a dipole is simulated which is moved from below upwardly at the frequency $f_s$ according to a sawtooth-shaped travel-to-time characteristic. By reflection of the emitted waves to ground from the aircraft, a corresponding radiator moved periodically downwardly is observed. From the aircraft then a Doppler frequency shift $f_D$ proportional to the sine of the elevation angle is observed.

Additionally, by the localizer beam transmitter the carrier frequency $f_o$ is emitted. The frequency spectrum observed in the aircraft then includes $f_o, f_o + f_h - f_D$ and $f_o + f_h + f_D$. From this $f_D$ and the elevation angle are determinable. The slant distance is determined in accordance with a prior art method from the pulse timing. The instrument arranged in the aircraft emits a pulse (interrogation pulse) which releases a sending pulse (answering pulse) on the associated instrument on ground. From the time difference between interrogation pulse and answering pulse the slant distance is determined.

An approach and landing system of the type indicated hereinbefore is described, for instance, in the article by Eckert and Roper "Das Anflug— und Landesystem SETAC" in the periodical "Luft— und Raumfahrttechnik" 16 (1970), No. 2, 43–48.

In the prior art approach and landing systems a localizer beam transmitter supplying azimuth and slant distance, is arranged at the end of the runway, while a glide path beam transmitter generating a signal for the elevation angle, is located adjacent to the runway opposite the ideal point of touchdown. The landing approach is effected along a straight radial trajectory corresponding to a constant elevation angle and aligned with the runway. The elevation angle, which also corresponds to the trajectory angle, is very small for conventional aircraft and landing approaches and is in the order of magnitude of 3°.

Upon numerous occasions, aircraft must land on short runways which are surrounded by obstacles and/or densely populated areas. In such situations it is necessary to make a steep approach so that, for instance, on the one hand the obstacles at the end of the runway are safely crossed while on the other hand the aircraft touches down exactly at the beginning of the runway and has the full length of the runway available for the landing distance. In the case of military applications obstacles can also be attackers with light weapons in the vicinity of the airport. In a situation in which there are densely populated areas in the airport vicinity, the necessity for a steep approach results from the requirement of keeping the flight noise small in the densely populated areas and that therefore, the altitude in the airport vicinity should not be below a certain level. In order to safely cross obstacles and to keep noise annoyance at a minimum, in many cases steep non-linear approach profiles are required. These are not attainable with the conventional means for the manual and automatic aircraft trajectory guidance.

The aircraft's initial approach to the field is in horizontal flight until it reaches the localizer beam. It then turns in the azimuth into the direction of the localizer beam; the direction of the localizer beam coinciding with the intended path to the runway. Conventionally, the aircraft then approaches in horizontal flight until reaching the elevation angle of the glide path selected as required by the path angle for the landing approach. The crosspointer instrument now has zero passage. A change-over to linear landing approach is then effected at this angle. It is impossible to cause the actual path of movement of the aircraft to make the commanded sharp break but, instead, due to the inertia of the aircraft, it overshoots the command trajectory for the landing approach and then oscillates into the commanded trajectory. During this transient oscillation the path angles become necessarily greater than the elevation angle of the commanded glide path. This is not harmful as long as the selected path angle is small and due to overshooting, for instance, temporarily increases upon transient oscillation to a value of approximately 4° as compared to a path angle of 3°. However, if a steep landing approach is to be made, say at a path angle of 6° and steeper, then such an overshooting would temporarily produce path angles of 8°, which angles are neither tolerable with respect to passenger comfort nor under the aspect of flight safety.

It is also difficult and potentially dangerous to cause the aircraft to touch down on the runway at a steep path angle since the vertical speed near ground becomes excessive. Therefore, it is necessary to reduce the glide path angle in the last phase of approach to an angle of 3° in the case of conventional aircraft and of approximately 5° to 6° in the case of STOL-aircraft.

In the case of steep approaches it is worthwhile to fly non-linear trajectories. From the horizontal flight the aircraft must gradually change over to the guided descent so that there will be no overshooting as in the case of conventional intercept-procedure and the flight path angle must again be reduced prior to touch-down.

In conventional approaches the aircraft always approaches in the direction of the localizer beam axis and thus in the direction of the runway. In case of dense flight traffic the approaching airplanes will the crowd in this direction, increasing the danger of accidents and calling for a reduction of the landing frequency below what is technically possible. Also in the case of the conventional landing approach using a localizer beam it is not possible during the landing approach to circumfly obstacles or populated areas that lie in the direction of the runway.

In a prior art device for aircraft trajectory guidance as described in British Pat. specification 1,236,141 the aircraft receives a signal indicative of the reciprocal of slant distance from a transmitter adjacent the runway. A function generator produces a commanded elevation angle signal. This signal is compared at a center reading instrument to an actual elevation signal from the transmitter indicative of the elevation angle at which the aircraft is viewed form the transmitter. The pilot steers the aircraft in accordance with the reading of this center reading instrument. The function generator is designed to command a trajectory containing portions which are not radial to the transmitter. Commanding the elevation angle as a function of slant distance and comparing it to the measured actual elevation angle presents the problem that the loop gain of the control loop (including a human or automatic pilot) is increased as the aircraft approaches the transmitter. This results in instability of the control loop and hunting in the range just near touchdown, where a correct trajectory guidance is most critical.

In other prior art devices, such as that disclosed in U.S. Pat. No. 3,588,477 a function generator provides a commanded height signal as a function of distance from a transmitter. This commanded height signal is compared to an actual altitude signal from an altimeter. These devices present also problems: Signals from a barometric altimeter are not particularly accurate as a measure of height above the airport runway and, furthermore, are dependent on barometric pressure. On the other hand signals from a radio altimeter are only indicative of height above ground at the location of the aircraft rather than of height with reference to the runway.

It is an object of the invention to provide a device for the aircraft trajectory guidance along a trajectory extending not strictly radially to a localizer and/or glide path transmitter and possibly being non linear (i.e. curved).

It is a more specific object of the invention to provide a device of the type mentioned hereinbefore in which, on one hand, the sensitivity or the loop gain of the control loop (including the human or automatic pilot) is selected to prevent hunting at any point along the trajectory, while, on the other hand, actual aircraft position information is derived from a transmitter adjacent the runway and with reference to the transmitter location.

It is another object of the invention to provide a device of the type mentioned in the preceding paragraph, in which an error signal indicative of the deviation of the aircraft from a commanded trajectory is derived, substantially in terms of lateral travel, at least during the final stage of the approach.

It is a further object of the invention to provide a device of the type mentioned hereinbefore, in which the sensitivity or loop gain at large slant distances from the transmitter is selected to facilitate the intercept procedure.

It is a still more specific object of this invention to provide a device for the automatic trajectory guidance for a STOL-landing approach (i.e. a steep approach).

The apparatus of the invention uses a radio beam between transmitter means at a predetermined location (e.g. adjacent the runway) and a receiver on the aircraft. The receiver supplies actual signals indicative of the slant distance and of at least one angle (i.e. elevation or azimuth angle) of the aircraft from said transmitter means. Trajectory computer means are connected to said receiver to receive said slant distance signal and in response thereto to generate command signals establishing a commanded flight path for the aircraft. This commanded flight path may include curved portions and portions which are not radial to the transmitter means. In accordance with the invention, the trajectory computer means comprises function generator means to which said slant distance signal is applied and which supplies a command signal analogue to a co-ordinate of said commanded desired flight path associated with the slant distance corresponding to said slant distance signal. There are means for deriving, at least in a predetermined range of slant distances, from said slant distance signal and said angle signal and said command signal, a deviation signal indicative of the deviation, in terms of lateral travel, of the aircraft from said desired flight path. Said deriving means comprises multiplying means for multiplying angular information by a function of slant distance.

In one embodiment of the invention, said command signal is indicative of the value of an angle (i.e. elevation or azimuth angle) of the aircraft from the transmitter means were the aircraft on a desired trajectory at said actual slant distance. These commanded angles are, for instance:

(1) $\chi_{Lsoll} = f_a (R_a)$ (2) $\gamma_{Lsoll} = f_e (R_a - R_L)$ , where $\chi_{Lsoll}$ is the commanded azimuth angle, $\gamma_{Lsoll}$ is the elevation angle, $R_a$ is the slant distance from the localizer transmitter and $R_L$ is the distance between localizer and glide path transmitter. Thereby a commanded flight path is pre-established. The commanded angles are compared by comparing means with the respective actual angles $\chi_L$ and $\gamma_L$ at the measured slant distance and an angle deviation signal is produced. A second function generator means is connected to receive said slant distance signals and in response thereto to supply an output signal which is a preselected function of the slant distance signal. Said preselected function, at least in a range of small slant distances, increases proportionally with increasing slant distance. Multiplying means are connected to said comparing means and to said second function generator to produce a command signal as the product of the angle deviation signal and said output signal.

In another embodiment of the invention, a function generator receives the slant distance signal and supplies a command signal analogue to the height of the desired flight path at the slant distance associated with the slant distance signal. A signal indicative of the actual height of the aircraft relative to the location of the transmiitter is derived by multiplying the elevation angle signal by slant distance.

This invention is applicable to any trajectories, for instance also to conventional landing approaches at small path angle. The invention is, however, particularly advantageously used if the trajectory computer supplies command values for a non-linear flight profile for a STOL-landing approach and for steeper approaches with conventional aircraft for noise abatement purposes.

Similarly, in accordance with the invention non-linear trajectories can also be flown in the azimuth. Thus it is possible upon landing approach guided by the localizer beam to proceed along a non-linear trajectory so as to circumfly obstacles or populated areas, etc. A crowding of all approaching airplanes in the direction of the runway can also be avoided. Instead, the invention permits a spreading in the azimuth of the direction of approach of various aircraft. Guided again by the localizer beam, the airplanes may approach from different directions and only during the last phase of approach turn into the direction of the runway. Thus, the airplanes may touch down in relatively close succession and roll out, which is technically controllable, yet, during the landing approach the planes are on different trajectories so that a higher landing frequency is attainable without danger to the individual airplanes.

DESCRIPTION OF THE DRAWINGS

FIG. 9 illustrates the function which can be generated by the function transmitter of FIG. 6, of the slant distance signal as well as the smoothed course of function obtained with a time element according to FIG. 7;

FIG. 10 is a diagrammatic elevational view illustrating the flight path associated with FIG. 9;

FIG. 15 is a diagrammatic elevational view illustrating the geometry of the trajectory, that is height as a function of the horizontal distance from the glide path transmitter;

FIG. 16 is the function of the elevation function generator associated with FIG. 15;

FIG. 17 is a diagrammatic elevational view illustrating the trajectory of a helicopter;

FIG. 18 is the function of the elevation-function generator associated with FIG. 17;

FIG. 19 is a diagrammatic elevational view illustrating a typical trajectory for a steep approach of an aerodynamically carried airplane with horizontal approach;

FIG. 20 is the function of the elevation-function generator associated with FIG. 19;

FIG. 21 illustrates the guidance of the aircraft in a holding pattern;

FIG. 22 illustrates the function of the azimuthfunction generator associates with FIG. 21;

DESCRIPTION OF SPECIFIC EMBODIMENTS

Figure 2:
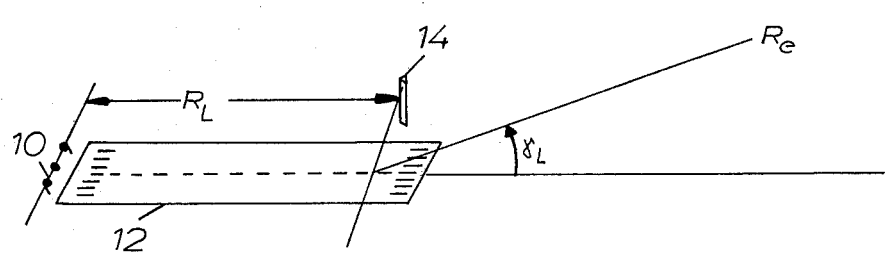
FIG. 2 is a perspective representation illustrating the arrangement of the localizer and glide path transmitter relative to the runway.
Figure 3:
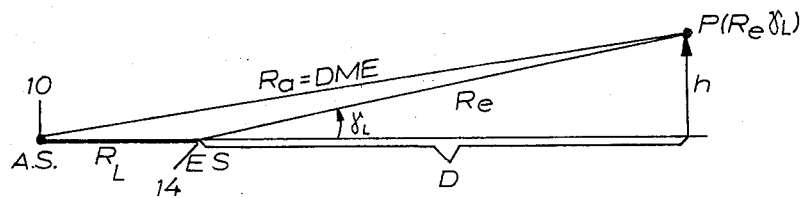
FIG. 3 is an associated side elevation showing the geometrical relations in the elevation measurement.

As can be seen from FIGS. 2 and 3, an azimuth-localizer beam transmitter 10 is arranged at the end of a runway 12, while a glide path transmitter 14 is located at the beginning of the runway 12 adjacent to the point of touchdown. The length of the runway 12 and therewith the spacing between the azimuth-localizer beam transmitter and the elevation-localizer beam transmitter is $R_L$. The azimuth-localizer beam transmitter 10 also includes a distance measuring unit (DME) for determining the slant distance $R_a$ from the azimuth-localizer beam transmitter 10 to the aircraft.

As can be seen from FIG. 3, the position P of the aircraft is defined by the slant distance $R_e$ between elevation-localizer beam transmitter 14 and the aircraft and the elevation angle $\gamma_L$. The three quantities $R_a$, $R_L$ and $\gamma_L$ are formed by a beam receiver 16 (FIG. 1) from the beam signals, also the azimuth angle $\chi_L$ which is supplied by the localizer beam transmitter 10 in the manner described hereinbefore.

The signals thus obtained are processed by the trajectory guiding instrument 18 illustrated in FIG. 1 in the following manner:

The $R_a$ signal from the DME is supplied to a function generator 20 which supplies a setpoint value $\chi_{Lsoll}$ as an azimuth angle function of the slant distance from the azimuth-localizer beam transmitter:

(1) $\chi_{Lsoll} = f_a(R_a)$.

At point 22 the runway length $R_L$ is subtracted from $R_a$. For small elevation angles $R_e$ can be made $R_e = R_a - R_L$, i.e. the slant distance $R_e$ from the glide path transmitter is approximately equal to the slant distance $R_a$ from the azimuth-localizer beam transmitter less the distance $R_L$ between the localizer beam transmitter and the glide path transmitter 14. This value $R_a - R_L$ is applied to a function generator 24 for the elevation. The function generator 24 supplies a setpoint value $\gamma_{Lsoll}$ for the elevation angle $\gamma_{Lsoll} = F_e(R_a - R_L)$.

Thus, a commanded trajectory is given in polar coordinates by the preceding relation for $\chi_{Lsoll}$ and $\gamma_{Lsoll}$. The setpoint values for azimuth and elevation angles at the output of the function generators 20 and 24 respectively are compared at 26 and 28 respectively with the actual values $\chi_L$ and $\gamma_L$ respectively which are also supplied by the beam receiver. Thus, the angle deviation signals $\Delta\chi_L$ and $\Delta\gamma_L$ respectively are obtained.

An elevational deviation $\Delta h$ or lateral deviation due to an interference becomes increasingly more noticeable in the angle error $\Delta\gamma_L$ and $\Delta\chi_L$ respectively the closer the aircraft approaches the beam transmitter, thus the smaller becomes $R_e$ and $R_a$ respectively. Therewith, the controller, or the indication, becomes increasingly more sensitive upon approximation to the beam transmitter, so that finally, the aircraft can hardly be maintained on the beam. In order to avoid these difficulties, the slant distance signal $R_a$ is also applied to a function generator 30. The function transmitter 30 supplies a setpoint signal which is a function $g_a(R_a)$ of $R_a$. By way of example, this function $g_a$ may, for smaller values of $R_a$, increase proportionally to $R_a$ and then assume a constant value.

The azimuth-angle deviation signals $\Delta\chi_L$ is multiplied by this output signal of the function generator 30 in a multiplying element 32. The multiplying element 32 then supplies a deviation signal which is a function $f(\Delta s)$ of the travel deviation $\Delta s$ (instead of the angle deviation $\Delta\chi_L$). For the above mentioned function $g_a$ first a proportionality of the output signal to the travel deviation $\Delta s$, i.e. a constant sensitivity of the instrument with respect to travel deviations from the commanded trajectory, is obtained. For greater slant distances $R_a$ a constant value of the function $g_a$ is obtained which again leads to a proportionality of the output signal to the angle deviation $\chi_L$, i.e. a decrease in the sensitivity with respect to travel deviations $\Delta s$ with increasing slant distance. Depending on the requirements other functions $g_a(R_a)$ of the slant distance $R_a$ also can be formed in order to obtain the desired level of sensitivity of the instrument.

Similarly, the slant distance signal $R_e = R_a - R_L$ is additionally supplied to a function generator 34 whose output signal $g_a(R_a - R_L)$ is multiplied by the elevation-angle deviation signal $\Delta\chi_L$ in a multiplying element 36. Then, at the output of the multiplying element a signal $f(\Delta h)$ is obtained as a function of the elevational deviation $\Delta h$. Also in this channel at least for small $R_e$ a constant sensitivity to elevational deviations $\Delta h$ can be obtained.

Thus, by the function transmitters 20 and 24 a possibly non-linear trajectory is commanded. By the function transmitters 30 and 34 the sensitivity of the indication or of the control along this trajectory is given in the desired manner.

The deviation signals $f(\Delta s)$ and $f(\Delta h)$ are applied to an automatic pilot as is indicated by the arrows 38 and 40. Moreover these signals are applied to the two systems of a cross-pointer instrument 42.

Figure 4:
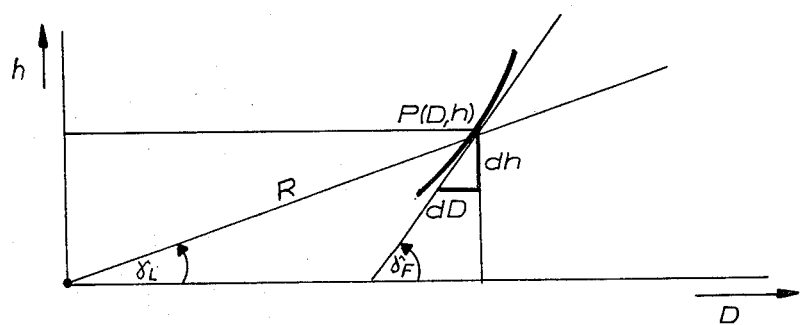
FIG. 4 serves to illustrate the connection between altitude, slant distance and elevation angle.

By means of FIG. 4 the connection between the desired trajectory $h(R_e)$ and the function $f_e(R_e)$ to be stored in the function generator 24 shall be derived for various cases:

Therein, (3) $h = R_e \sin \gamma_L$.

By differentiation it results $$\frac{dh}{dR_e} = R_e \frac{d\gamma_L}{dR_e} \cos \gamma_L + \sin \gamma_L \qquad (4)$$

For small angles ($<10°$) $\cos \gamma_L$ can be made 1 and $\sin \gamma_L = \gamma_L$.

This results to $$\frac{dh}{dR_e} = R_e \frac{d\gamma_L}{dR_e} + \gamma_L \qquad (5)$$

If the function $f_e(R_e)$ consists of straight lines, then $$\frac{d\gamma_L}{dR_e} = c \qquad (6)$$

or (7) $\gamma_L = \gamma_{L0} + cR_e$. If this is substituted in equation (5) then $$\frac{dh}{dR_e} = R_e c + \gamma_{L0} + cR_e = 2R_e c + \gamma_{L0} \qquad (8)$$

An integration supplies (9) $h = cR_e^2 + \gamma_{L0} R_e$

Thus a parabola in the trajectory extending through the coordinate origin $R_e = 0$, $h = 0$ corresponds to a straight line segment of the function of the function generator 24. For $c = 0$ (horizontal straight line segment in the function $f_e(R_e)$) a straight line through the coordinate origin is obtained as a special case of the parabola.

Figure 5:
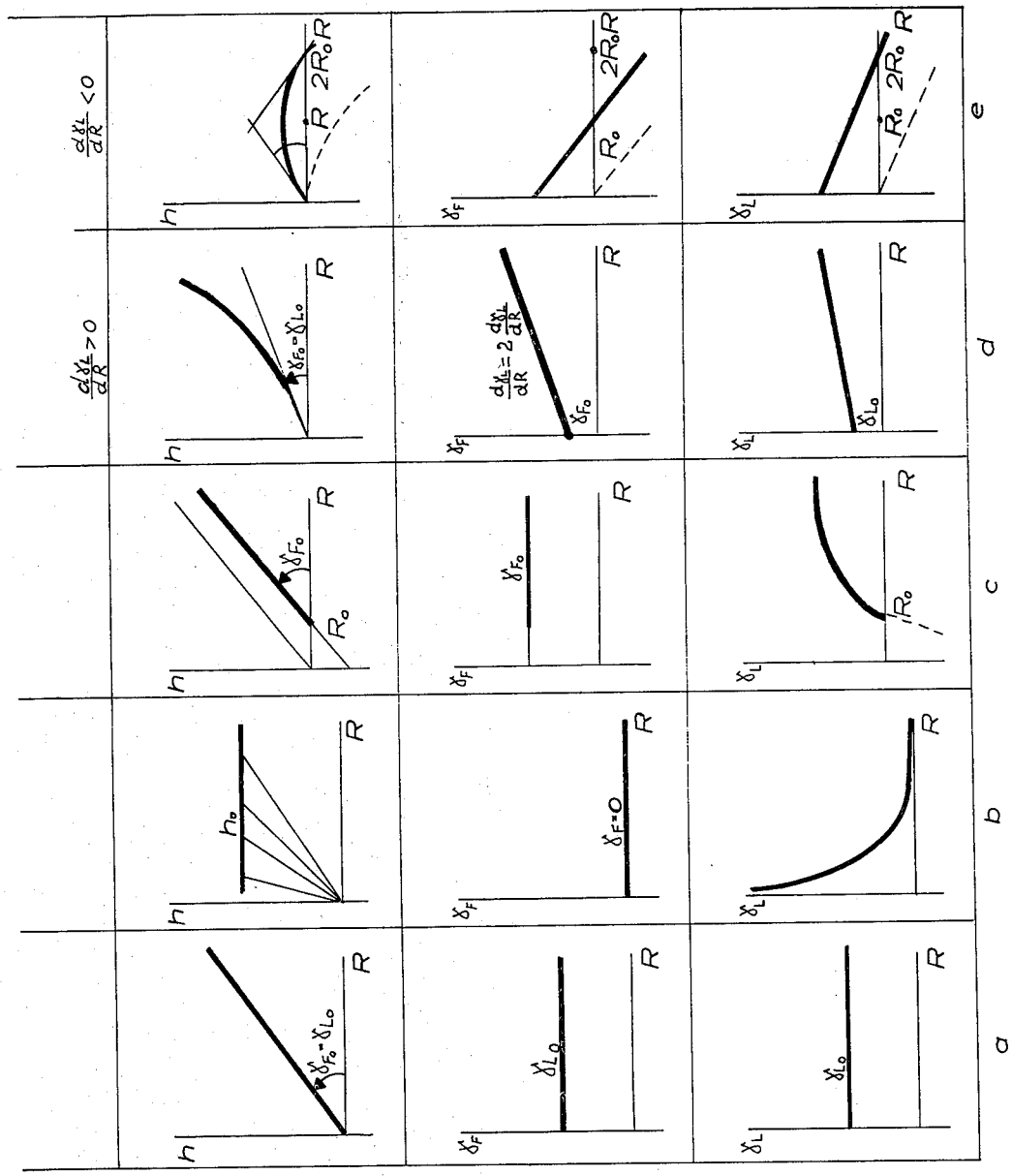
FIG. 5 a through e is a representation of five different trajectory forms, of the associated path angles and the respective associated course of the elevation angle in dependence on the slant distance.

FIG. 5 shows various path curves h ($R_e$) for the different functions $\gamma_L = f_e (R_e)$ and the associated path angles $\gamma_F$.

The cases discussed hereinbefore are illustrated in the columns a, d and e of FIG. 5; Column a illustrates the case wherein the function $\gamma_L = f_e (R_e)$ is a horizontal straight line segment $\gamma_L = \gamma_{L0}$. In this case, the trajectory (uppermost line) is a rectilinear path through the coordinate origin at a constant path angle $\gamma_F = \gamma_{L0}$.

For $d_{\gamma_L}/dR_e = c > 0$ (column d in FIG. 5) a parabolic trajectory through the coordinate origin is obtained. Such a trajectory may, for instance, be provided for flare. The path angle decreases linearly towards R = 0 down to a value $\gamma_{F0}$.

For $\dfrac{d\gamma_L}{dR_e} = c < O$ (column c) a parabola curved convexly upwardly is obtained. Parts of such parabola may constitute the trajectories during the transition from horizontal approach to descent.

For the horizontal flight at the elevation $h_o$ the uppermost line of column b in FIG. 5 provides the relation $$\sin \gamma_{Lsoll} \approx \gamma_{Lsoll} = \frac{h_o}{R_e} \qquad (10)$$

This is a hyperbolic function for $\gamma_L = f_e (R_e)$. The path angle $\gamma_F$ is zero.

A rectilinear trajectory not passing through the coordinate origin (column c) is given by

(11) $h = -\gamma_F R_o + \gamma_F R_e$

Due to $$\gamma_L = \frac{h}{R_e} \qquad (12)$$

$$\gamma_L = -\gamma F \frac{R_o}{R_e} + \gamma F \qquad (13)$$

These relations are illustrated in column c of FIG. 5.

From the functions illustrated in FIG. 5 practically all desired trajectories can be generated. Generally, it is sufficient for the function transmitter 20 or 24 if it supplies a function set up of three straight line segments, as it is represented, for instance, by the solid line curve 44 in FIG. 9. This curve comprises three successive curve pieces 46, 48, 50. Curve piece 46 is a decreasing straight line similar to column e in FIG. 5, the path curve caused thereby is a parabola convex upwardly 52 (FIG. 10) which establishes the transition from horizontal approach to steep descent. The intermediate piece 48 of the function between the values $R_o$ und $R_1$ is horizontal $\gamma_L = \gamma_F$. The associated path curve is a radial straight line 54 representing the descent upon landing approach. In the last phase of the landing approach the path angle must again be reduced for flare. The function generator 24 supplied an increasing straight line 50 in the function $\gamma_L = f_e (R_e)$ for $R_e < R_o$ which according to column d in FIG. 5 causes a path curve in the form of a parabola 56 curved downwardly, which passes into the coordinate origin disposed in the point of touchdown at a finite path angle $\gamma_{F0} = \gamma_{L0}$. Shortly prior to touchdown a trajectory guidance by means of radar altimeters is advantageously effected. A change-over to radar altimeters is effected when reaching $$h + c_1 \dot{h} = 0$$

this value $h + c_1 \dot{h}$ continuing to be regulated to the value zero.

The path curve commanded by the straight line segments in the function of the function generator 24 through substantially complying with the requirements, however, still contains undesired break points 58, 60 at $R_1$ and $R_o$, respectively. In order to avoid such break points an arrangement according to FIG. 7 may be provided. In this arrangement a circuit 62 in the function generator 24 is provided, which circuit supplies a function of the input signal $R_e$ strictly comprised of straight line segments in the described manner. This circuit 62 is followed by a time element 64 of a frequency characteristic $$\frac{1}{1+Ts}.$$

Figures 7, 8:
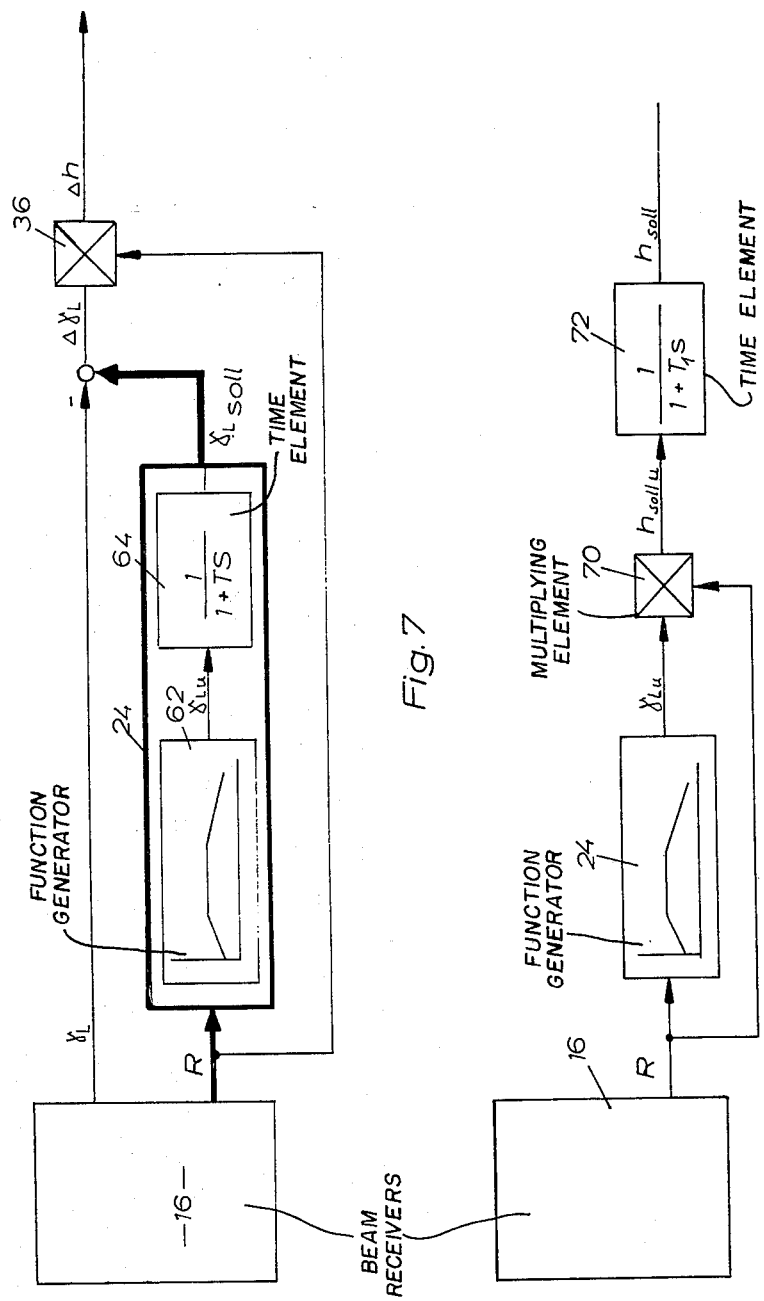
FIG. 7 is a schematic diagram illustrating a circuit possibility for such a function generator in a trajectory guiding device of the invention, which smooths the break points by incorporating a time element.
FIG. 8 is a schematic diagram illustrating a modified circuit including the function generator and a time element.

In this expression T is a time constant and s is the variable of the Laplace transform (see "Gyroscopes: Theory and Design" by Paul Savet, McGraw-Hill 1961, pages 25–31). This results in a delay which may possibly be allowed for by the selection of the straight line segments 46 and 50, and above all a smoothing of the break points so that both in the function supplied by the function generator 24 and also in the path curve produced thereby a rounded off transition from one curve section to the next one is effected. This is illustrated by the dotted curves 66 in FIG. 9 and 68 in FIG. 10. Otherwise, the arrangement of FIG. 7 is designed similarly to the corresponding part of FIG. 1. Herein, the function generator 34 is a direct transfer of the signal $R_e$.

A modified embodiment is illustrated in FIG. 8. Herein, the signal $R_e$ supplied by the localizer beam transmitter 16 is applied to a function generator 24 which supplies a function comprised of three straight line segments, as unsmoothed setpoint value $\gamma_{Lu}$ of the elevation angle. This setpoint value of the elevation angle is multipled by the slant distance signal $R_e$ in a multiplying element 70, so that a height setpoint value $h_{soll\ u}$ is obtained (again unsmoothed). This unsmoothed height setpoint value $h_{soll\ u}$ is applied to a time element 72 of a frequency characteristic $$\frac{1}{1+T_1 s}$$

which supplies an elevation setpoint value $h_{soll}$ This elevation setpoint value $h_{soll}$ is used as a command value for the automatic pilot and is compared with an elevation actual value.

Figure 6:
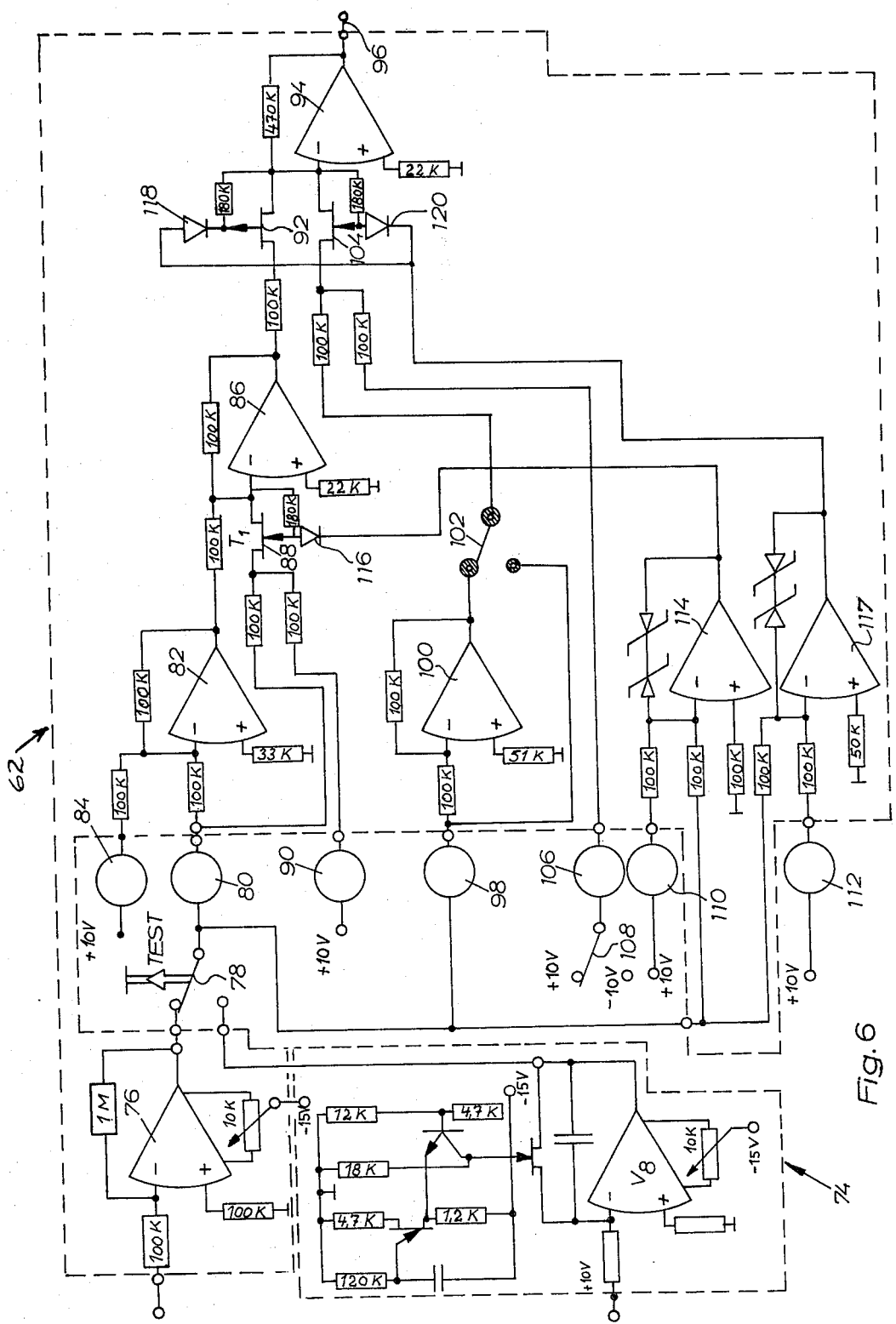
FIG. 6 is a schematic diagram of an example of a function generator permitting generation of a function of an input signal, which function is composed of three straight line segments.

FIG. 6 is a circuit example of how a function generator 62 (FIG. 7) or 24 (FIG. 8) can be designed with a function comprised of three straight line segments.

In this circuit there is a sawtooth generator 74 by which a linearly increasing slant distance signal is simulated so that thereafter adjustment of the function $f_e (R_e)$ can be effected, for instance, by means of an oscillograph.

The slant distance signal $R_a$ from the localizer beam receiver (DME) is amplified via a pre-amplifier 76 and is supplied to a summing amplifier 82 via a switch 78 and an adjusting potentiometer 80. Switch 78 alternatively permits sawtooth generator 74 to be connected to amplifier 82 for purposes of adjustment. A fixed voltage adjustable at a potentiometer 84 is also applied to the input of the summing amplifier 82.

The output of the summing amplifier 82 is applied to the input of another summing amplifier 86. To the input of this other summing amplifier 86 is applied, on one hand, the signal voltage from the potentiometer 80, and on the other hand a fixed voltage picked off across a potentiometer 90. These are applied through a field effect transistor 88 which acts as an on-off switch. The output of the summing amplifier 86 is applied to an output 96 of the function generator via a field effect transistor 92 acting as switch and a summing amplifier 94.

The signal $R_e$ from the pre-amplifier 76 is applied to an inverting amplifier 100 via the switch 78 and a potentiometer 98. The output of the amplifier 100 is applied to the summing amplifier 94 through a switch 102 and a field effect transistor 104. The switch 102 permits inverting amplifier 100 to be by-passed so that the signal from the potentiometer 98 can also be fed directly to the field effect transistor 104 and the input of the amplifier 94 without inversion. At a potentiometer 106 a portion of a fixed voltage can be picked off. The potentiometer 106 can optionally be connected to a positive or to a negative d.c. voltage by a switch 108. The fixed voltage picked off across the potentiometer 106 is also applied to the input of the summing amplifier 94 via the field effect transistor 104. At a potentiometer 110 a voltage corresponding to the slant distance $R_o$ (FIG. 9) is adjusted at which the transition from the straight line segment 48 to the straight line segment 50 is effected. At another potentiometer 112 a voltage corresponding to the slant distance $R_1$ is adjusted at which the transition from the straight line segment 46 decreasing with increasing $R_e$ to the horizontal straight line segment 48 is effected. The voltage at potentiometer 110 is applied to an input of a comparator 114 to whose other input the slant distance signal $R_e$ is applied and by which the field effect transistor 88 is controlled via a diode 116. The control is such that the field effect transistor 88 blocks for $R_e < R_o$ and conducts for $R_e > R_o$. The potentiometer 112 connects to an input of a second comparator 117 whose other input also has applied thereto the slant distance signal $R_e$ or the simulated slant distance signal from the sawtooth generator 74 depending upon the position of the switch 78. The comparator 117 controls the field effect transistor 92 via a diode 118 and the field effect transistor 104 via a diode 120. The control is such that for slant distances $R_e < R_1$ (FIG. 9) the field effect transistor 92 is conducting and the field effect transistor 104 blocks and for slant distances $R_e > R_1$ the field effect transistor 92 blocks and the field effect transistor 104 becomes conducting.

The amplifiers and comparators are designed with suitably wired operational amplifiers. The summing amplifiers are wired so that the unity gain is obtained. The design and wiring of the individual amplifiers, comparators and of the sawtooth generator is conventional technique and therefore not described here in greater detail.

The operation of the described function generator is as follows:

The amplifiers 83 and 86 with the potentiometers 80 and 84 determine the straight line segment 50 (FIG. 9). The potentiometer 90 determines the horizontal straight line segment 48, and the amplifier 100 with the potentiometers 98 and 106 determine the succeeding straight line segment 46 whose slope and position relative to the coordinate axes can be inverted in sign by the switches 102 and 108. Changeover from one straight line segment to the next one in dependence on the slant distance is effected by the comparators 114, 117 via the field effect transistors 88, 92 and 104.

In detail, the circuit operates in the following manner:

For $R_e < R_o$ the field effect transistor 88 is blocked, the field effect transistor 92 is conducting and the field effect transistor 104 is blocked. The slant distance signal $R_e$ is transferred proportionally via the potentiometer 80 and the amplifiers 82 and 86 with a proportionality factor adjustable at the potentiometer 80, which determines the slope of the straight line segment 50 in FIG. 9. By the potentiometer 84 this proportionally transferred slant distance signal $R_e$ has superimposed thereon a constant voltage determining the value $\gamma = \gamma_{FO}$ (FIG. 9). This sum transferred by the amplifiers 82 and 86 is applied to the output 96 via the conducting field effect transistor 92 and amplifier 94. The output voltage increases according to the straight line 50.

For $R_e = R_o$ the field effect transistor 88 becomes conducting. Therewith the slant distance signal picked off at the potentiometer 80 is directly applied to the input of the summing amplifier 86 by-passing the inverting summing amplifier 82. Therewith, the signal proportions applied from the amplifier 86 and dependent on the distance stand out so that the slope of the function becomes zero. The level of the signal obtained at the output can be adjusted in this range by means of the potentiometer 90, and of course, this adjustment has to be selected so that the straight line segments continuously follow each other for $R_o$, when the comparator 114 switches.

For the slant distance $R_e = R_1$ which is adjusted at the potentiometer 112, the comparator 117 switches and blocks the field effect transistor 92. Therewith, the total channel including the amplifiers 82, 86 is separated from the output. Instead, the field effect transistor 104 becomes conducting, whereby the amplifier 100 or, via the switch 102 the potentiometer 98, is directly connected to the input of summing amplifier 94 to which input the slant distance signal had been applied. Again, a signal proportion proportional to the slant distance signal $R_e$ is produced at the output 96, and that is in dependence on the position of the switch 102 with positive or (as in FIG. 9) negative sign. This signal proportion has superimposed thereon a fixed, yet adjustable, voltage from the potentiometer 106 which is positive or negative depending on the position of the switch 108. Of course, this voltage must be adjusted so that the output signal is steady, thus, the straight line segments follow each other for $R_1$.

With such a function generator the various desired approach profiles can be approximated by parabolas and radial straight lines. Similarly to the above described elevational guidance a lateral guidance can be effected substantially by the same means. Of course, other function generators for generating suitable functions of the slant distance also can be used and combined with each other.

By way of example, hyperbolic functions can be produced in known manner by appropriate diode networks.

A few applications of this invention are illustrated in the FIGS. 11 to 24.

Figure 11:
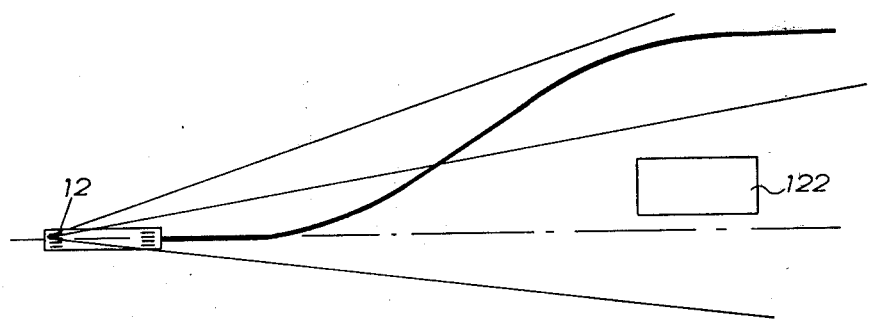
FIG. 11 is a diagrammatic plan view illustrating an application of the invention to a landing approach along a trajectory curved in the azimuth.

In accordance with FIG. 11 an approach trajectory in the azimuth of the aircraft relative to the runway 12 is not guided rectilinearly but rather in a path such that the aircraft is guided laterally around an obstacle 122.

Figures 12, 13:
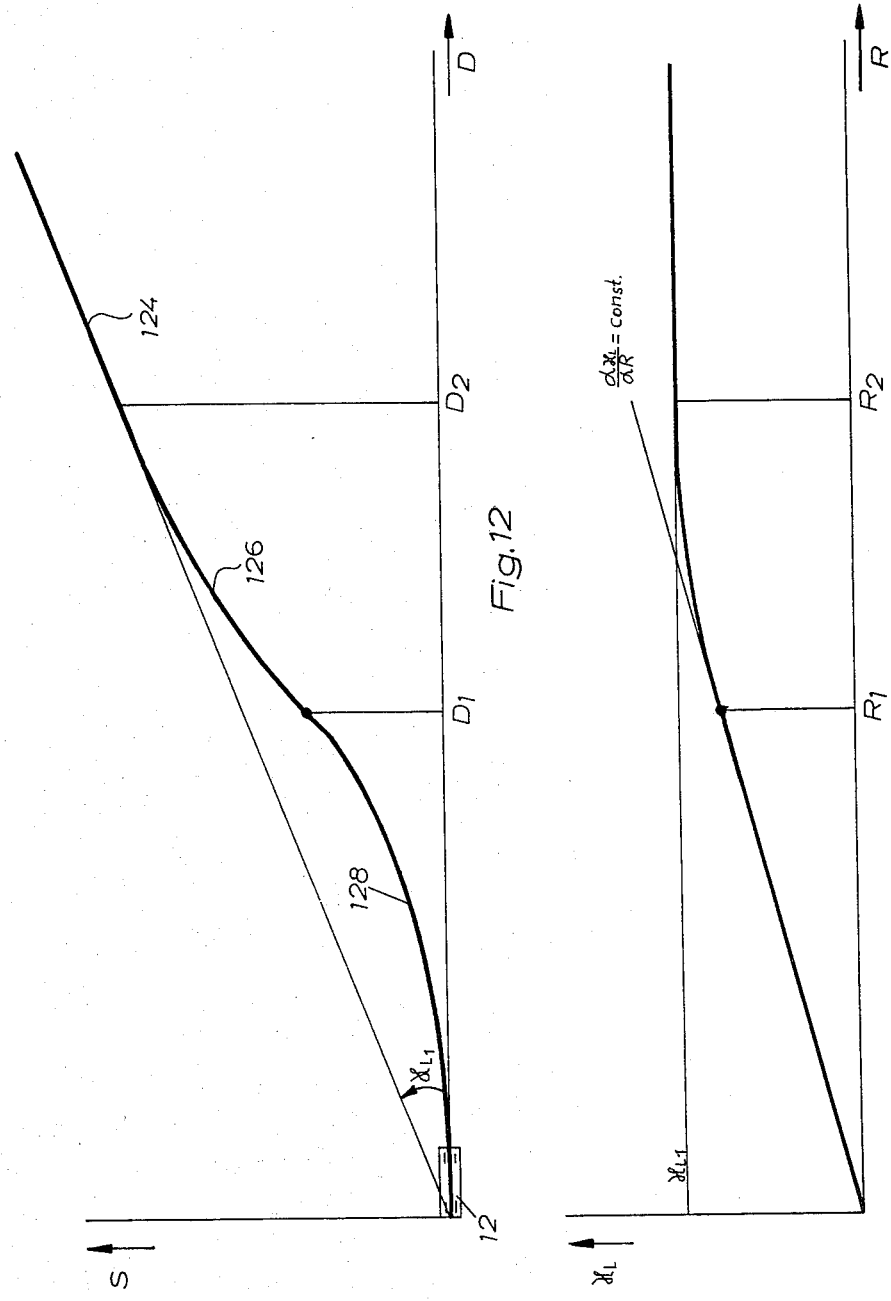
FIG. 12 is a diagrammatic plan view illustrating the "spreading" of trajectories in the azimuth.
FIG. 13 is the function associated with an approach path according to FIG. 12, of the azimuth function generator in a trajectory guiding device incorporating the invention.

FIG. 12 illustrates a landing approach guided in the azimuth. The aircraft first approaches linearly at 124 at an angle to the direction of the runway. At the distance $D_2$ a left turn 126 and following thereafter at the distance $D_1$ a right turn 128 are made guided by the localizer beam. Therewith the trajectory turns into the direction of the runway. In this manner, several trajectories, while spread apart, can be provided and guided so that several airplanes landing in short succession can approach on different paths. FIG. 13 illustrates the function of the function transmitter 20 associated with the FIG. 12 approach.

Figure 14:
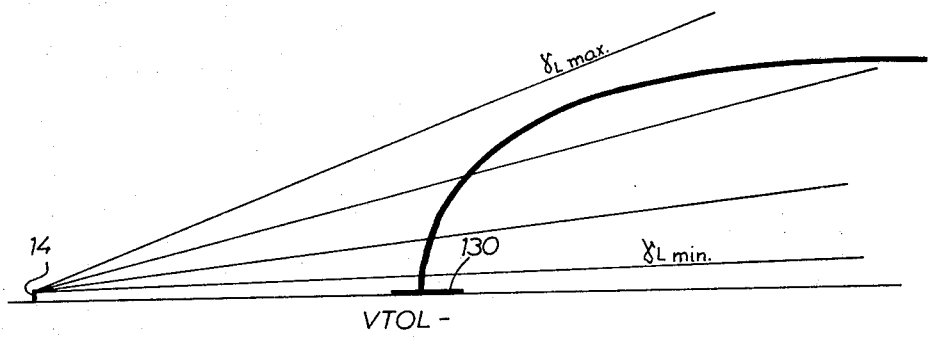
FIG. 14 is a diagrammatic elevational view illustrating the trajectory for a VTOL-aircraft in its position relative to a glide path transmitter.

FIG. 14 illustrates the trajectory on which a VTOL-aircraft is guided to a VTOL-landing field 130 by a glide path transmitter 14. FIG. 15 illustrates the geometry of the trajectory, and FIG. 16 shows the associated function of the function generator 24.

FIG. 17 illustrates the approach trajectory of a helicopter towards a landing field 132. The associated function of the function generator 24 is illustrated in FIG. 18.

FIG. 19 illustrates the approach profile for a steep approach with a wing supported aircraft. The aircraft approaches horizontally as far as to a distance $D_3$. The function of the function generator 24 in this range is a hyperbola. Between the distances $D_2$ and $D_1$ a rectilinear, yet not radial approach takes place as at 134. The associated function of the function generator 24 (FIG. 20) again is a hyperbola $$\gamma_L = \gamma_{F2}\left(1 - \frac{R_o}{R_e}\right),$$

as has already been explained in connection with FIG. 5, column c.

The flare is effected at $R_e < R_1$ along a parabola 136, corresponding to a straight line segment 138 of the function of FIG. 20. Between $D_3$ and $D_2$, respectively $R_3$ and $R_2$ a transition takes place from one hyperbola to the other.

FIG. 21 illustrates the possibility of guiding an aircraft in a holding pattern 140 by means of the localizer beam. FIG. 22 illustrates the required function of the azimuth-function generator 20. The two straight trajectories 142 and 144 are produced by hyperbolic segments 146 and 148 respectively. Due to the non-ambiguity of the function of FIG. 22 at each end of the holding pattern a changeover from one branch of the function to the other one must automatically be effected.

Figure 23:
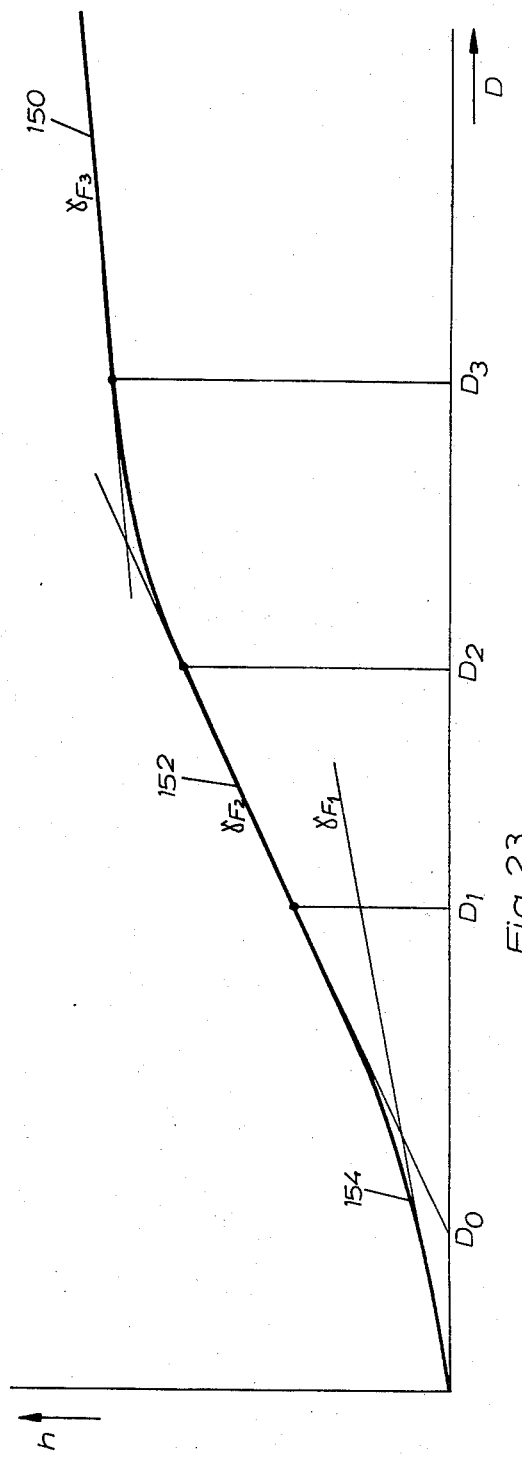
FIG. 23 is a diagrammatic elevational view illustrating another trajectory for the steep approach of an aerodynamically carried airplane.
Figure 24:
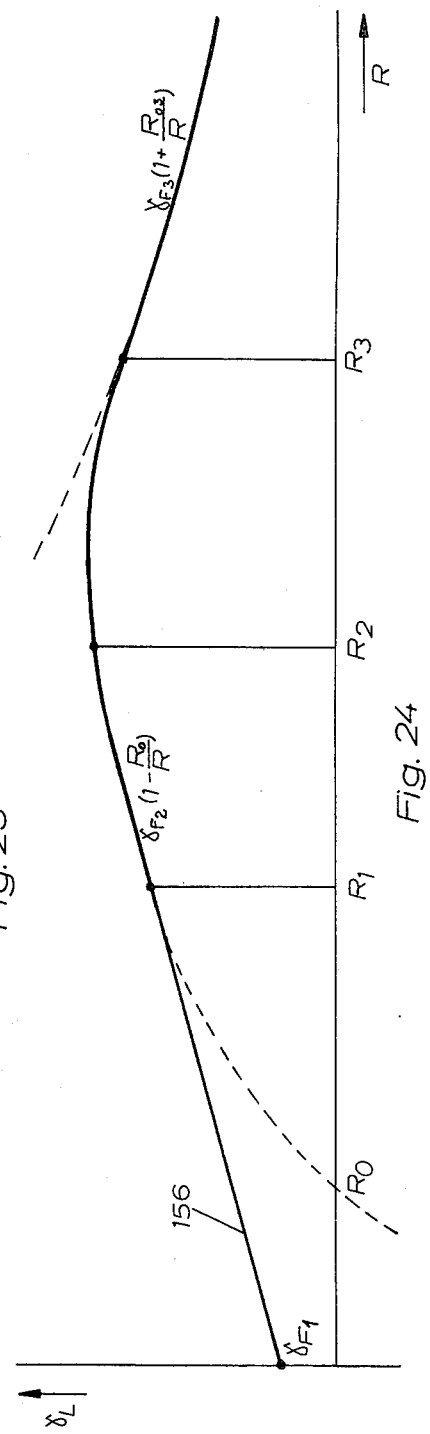
FIG. 24 illustrates the function of the elevation-function generator associated with FIG. 23.

FIG. 23 illustrates the approach profile for a steep approach from a non-radial descent 150 as far as to a distance $D_3$, respectively slant distance $R_3$. The function of the function transmitter 24 is a hyperbola (c in FIG. 5). A second, non-radial descent 152 takes place between the distances $D_2$ and $D_1$, respectively slant distances $R_2$ and $R_3$, where the function is again a hyperbola. The flare is effected along a parabola 154 which is produced by a straight line segment 156 in FIG. 24.

Figure 25:
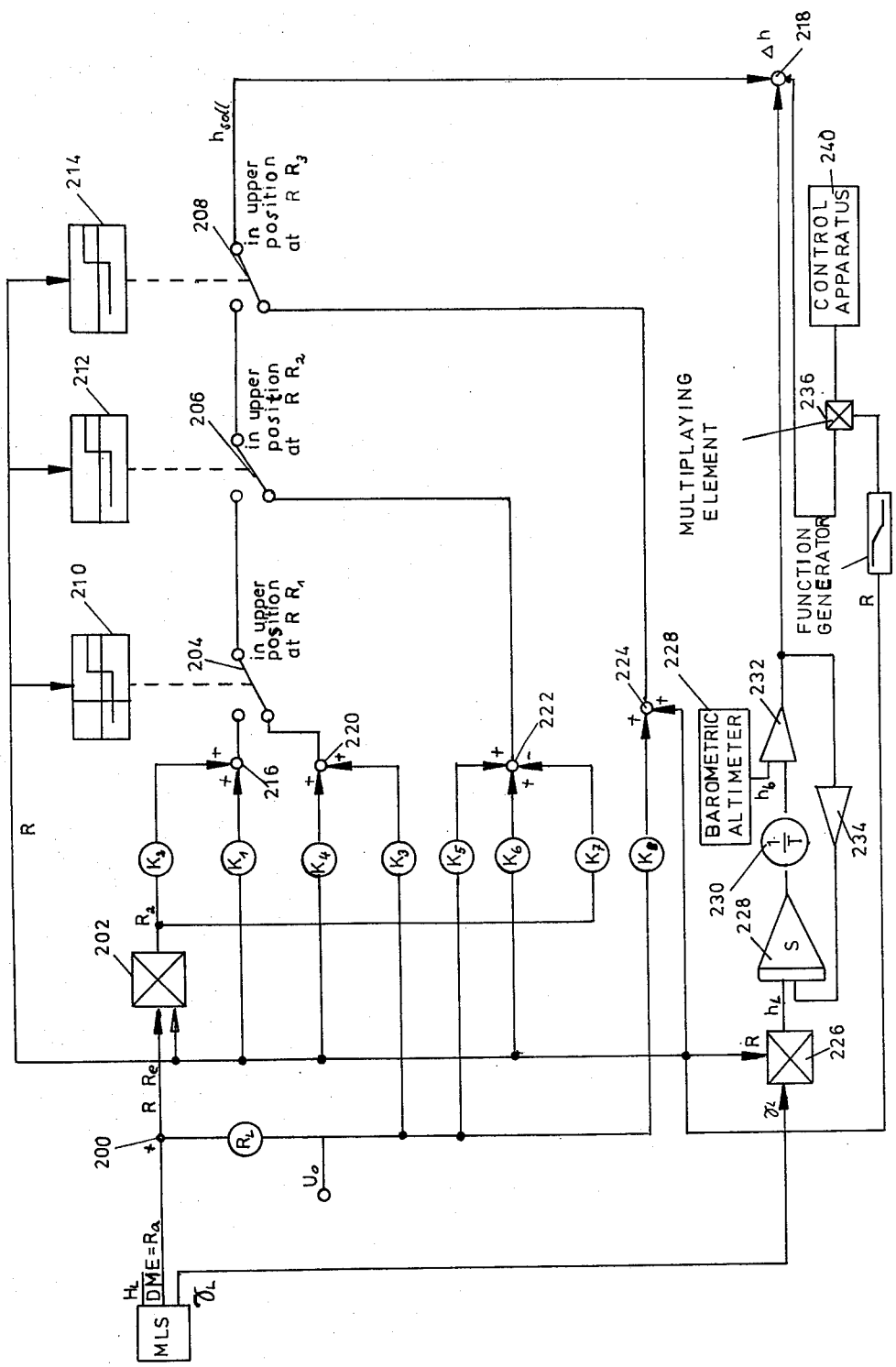
FIG. 25 is a block schematic diagram and shows another embodiment of a device for aircraft trajectory guidance incorporating the invention.
Figure 26:
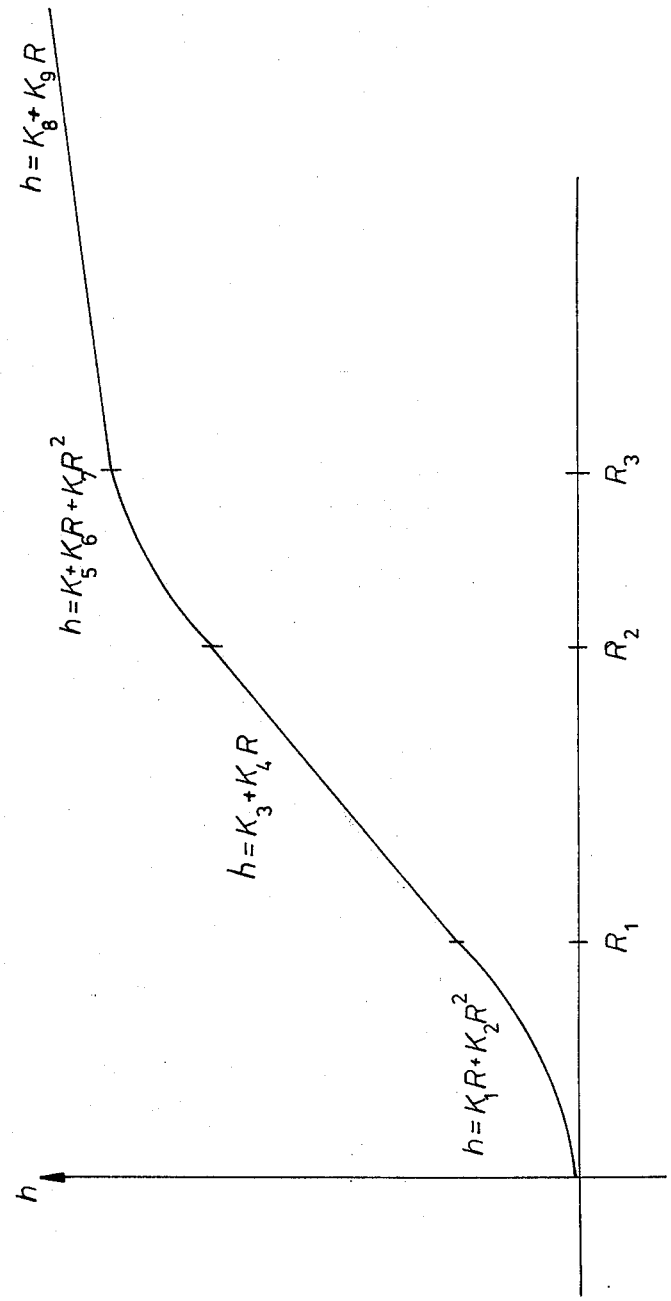
FIG. 26 illustrates the flight profile or trajectory commanded by the device of FIG. 25.

Referring now to FIGS. 25 and 26, a microwave landing system MLS produces three signals indicative of azimuth angle $\chi_L$, elevation angle $\gamma_L$ and slant distance $R_a$ from the azimuth transmitter (see FIGS. 2 and 3).

In point 200 the DME signal has subtracted therefrom a signal which is proportional to $R_L$ and is set at the correspondingly labelled potentiometer. The $R_L$-potentiometer is connected to a voltage source $U_o$ like the various other potentiometers $K_3$, $K_5$ and $K_8$ to be described hereinbelow. By forming the said difference $R_a - R_L$ a signal proportional to $R_e$ from the elevation transmitter is obtained, which will be called R for simplicity hereinbelow.

The R signal is applied to two inputs of a multiplying element 202 which consequently produces a signal proportional to $R^2$. The multiplying element is commercially available as an integrated circuit and needs not to be described in detail.

For $R < R_1$ ($R_1$ being a preselected slant distance) switch 204 is in its upper position. The same is true with switches 206 and 208 at distances $R < R_2$ and $R > R_3$, respectively, wherein $R_1 < R_2 < R_3$. (The symbol ">" means "is smaller than"). Switches 204, 206 and 208 are actuated by comparators 210, 212 and 214 respectively, to which the slant distance signal R is applied.

The $R^2$ — signal is applied through a potentiometer $K_2$ to summing device 216, to which, in addition, the R-signal is applied through potentiometer $K_1$. Thus the summing device 216 produces a signal $K_1R + K_2R^2$ at the upper contact of switch 204. With $R<R_1$, all switches 204, 206, 208 are in their upper positions, whereby the above signal is applied as command altitude signal $h_{soll}$ to difference device 218. Thus in a range $R R_1$, the command altitude signal $h_{soll}$ varies in accordance with the above function with slant distance, whereby a substantially parabolic flight profile as shown in FIG. 26 is obtained.

At a slant distance $R_1$, switch 204 is moved to its lower position as shown in FIG. 25. Switches 206 and 208 remain in their upper position.

The R-signal is applied through potentiometer $K_4$ to summing device 220. Also applied to summing device 220 is a constant signal from potentiometer $K_3$, which is connected to voltage source $U_o$. Thus the lower contact of switch 204 has applied thereto a signal $K_3 + K_4R$ which, in the range $R_1 < R < R_2$ is applied as altitude command signal $h_{soll}$ to difference device 218. In this range the command altitude $h_{soll}$ is a linear function of slant distance as shown in FIG. 26. Of course, the coefficients $K_1$, $K_2$, $K_3$, $K_4$ have to be selected in such a manner that the functions join smoothly (continuously and differentiably), as shown in FIG. 26.

At a distance $R_2$ switch 206 is moved into its lower position.

A summing device 222 has applied thereto a constant signal through potentiometer $K_5$, the R-signal through potentiometer $K_6$ and the $R^2$-signal through potentiometer $K_7$. Thus the lower contact of switch 206 receives a signal $K_5 + K_6R + K_7R^2$ which is applied to difference device 218 as command altitude signal $h_{soll}$.

At a slant distance $R_3$ switch 208 is moved into its lower position.

A summing device 224 has applied thereto a constant signal through potentiometer $K_8$ and a R-signal through potentiometer $K_9$, whereby the lower contact of switch 208 receives a signal $K_8 + K_9R$ This signal is applied to difference device 218 as $h_{soll}$ in the range $R > R_3$.

A smooth approach profile is thereby obtained composed of a parabola portion, a straight line, again a parabola portion (of opposite curvature) and a slightly inclined straight line again.

It should be noted that with the small angles involved slant distance is approximately equal to ground distance.

The circuit described provides the command altitude $h_{soll}$ as a function of slant distance. The actual altitude $h$ is basically derived also from the MLS. The elevation angle $\gamma_L$ is electrically multiplied in multiplying element 226 by the slant distance R, both these signals being derived from the MLS. This results in a signal $h_L$. The signal thus derived is dependent only on the relative position of the aircraft and the transmitter. It offers, therefore, an advantage over the prior art, in which actual altitude signals are derived from barometric or radio altimeters. However, this $h_L$-signal as a microwave transmitted signal comprises a noise component which increases with increasing slant distance R. If $\Delta R$ is the noise component of the slant distance signal and $\Delta\gamma_L$ is the noise component of the elevation angle signal, the output from multiplying element 226 would be $(\gamma_L + \Delta\gamma_L)(R + \Delta R) = \gamma_L R + \gamma_L \Delta R + R\Delta\gamma_L + \Delta\gamma_L \cdot \Delta R$ The term $\Delta\gamma_L \cdot \Delta R$ and, with small $\gamma_L$, even the term $\gamma_L \Delta R$ my be neglected. This results in an output signal $h_L + R\Delta\gamma_L$ with a noise component increasing with slant distance R from the transmitter. At large distances, the noise would therefore result in apparent random deviations from the actual aircraft position, the flight controller trying to eliminate these apparent deviations.

It would be possible to eliminate the noise in the MLS altitude signal by means of a low pass filter.

A low pass filter, however, would introduce a considerable lag in the control loop and therefore would severely interfere with the performance of the automatic or manual control.

In order to solve these problems, a second altitude signal $h_b$ from a barometric altimeter is used. The $h_L$-signal is applied to an integrator 228. The output from the integrator is applied through a filter 230 to one input of a summing amplifier 232. The other input of summing amplifier 232 has applied thereto the barometric altitude signal $h_b$. A feedback signal is applied to another input of integrator 228 (in opposition to the $h_L$-signal) through an amplifier 234.

Thus short time variations of altitude are derived from the barometric altimeter 228. Barometric altitude $h_b$ may, however, have an error with respect to true altitude $h_L$ as provided by the MLS. Such an error would result in a finite input at the integrator and, consequently, in an increasing output of the integrator. This output is applied as a corrective signal to the lower input of amplifier 232.

The result is that the $h_L$-signal derived from MLS provides a low frequency component of the altitude signal with the noise filtered out, which acts to eliminate any drift or offset from the altitude output signal $h$, and the $h_b$-signal provides a quick low-noise response to high frequency variations.

This signal $h$ is compared at difference device 218 to the command signal $h_{soll}$ to provide an error or deviation signal $\Delta h$.

Also in this modified device, the command signal is compared to a signal indicative of actual aircraft position which is derived from the MLS and is therefore independent of the topography of the surroundings and of absolute barometric pressure, the deviation signal being in terms of altitude deviation.

A very accurate control of the trajectory is required near ground, and therefore the loop gain of the control loop (including the human or automatic pilot) should be comparatively high, though not too high to cause hunting. On the other hand, at large slant distances from the transmitter the response of the control apparatus to deviations from a desired flight path should be reduced, in order to facilitate the intercept procedure. Therefore in a preferred embodiment the deviation signal ($\Delta h$ in the case of altitude control) is applied to one input of a multiplying means 236. The slant distance signal R from the receiver MLS is applied to a function generator means 238, which is adapted to supply a signal as a function of slant distance, which function has a constant relatively high value in a range of small slant distances, and decreases in a median range to another, relatively low constant value which prevails in a range of large slant distances. The output from said function generator means is applied to the second input of the multiplying means 236. The output of the multiplying means is supplied as an error signal to the control apparatus 240.

Figure 1:
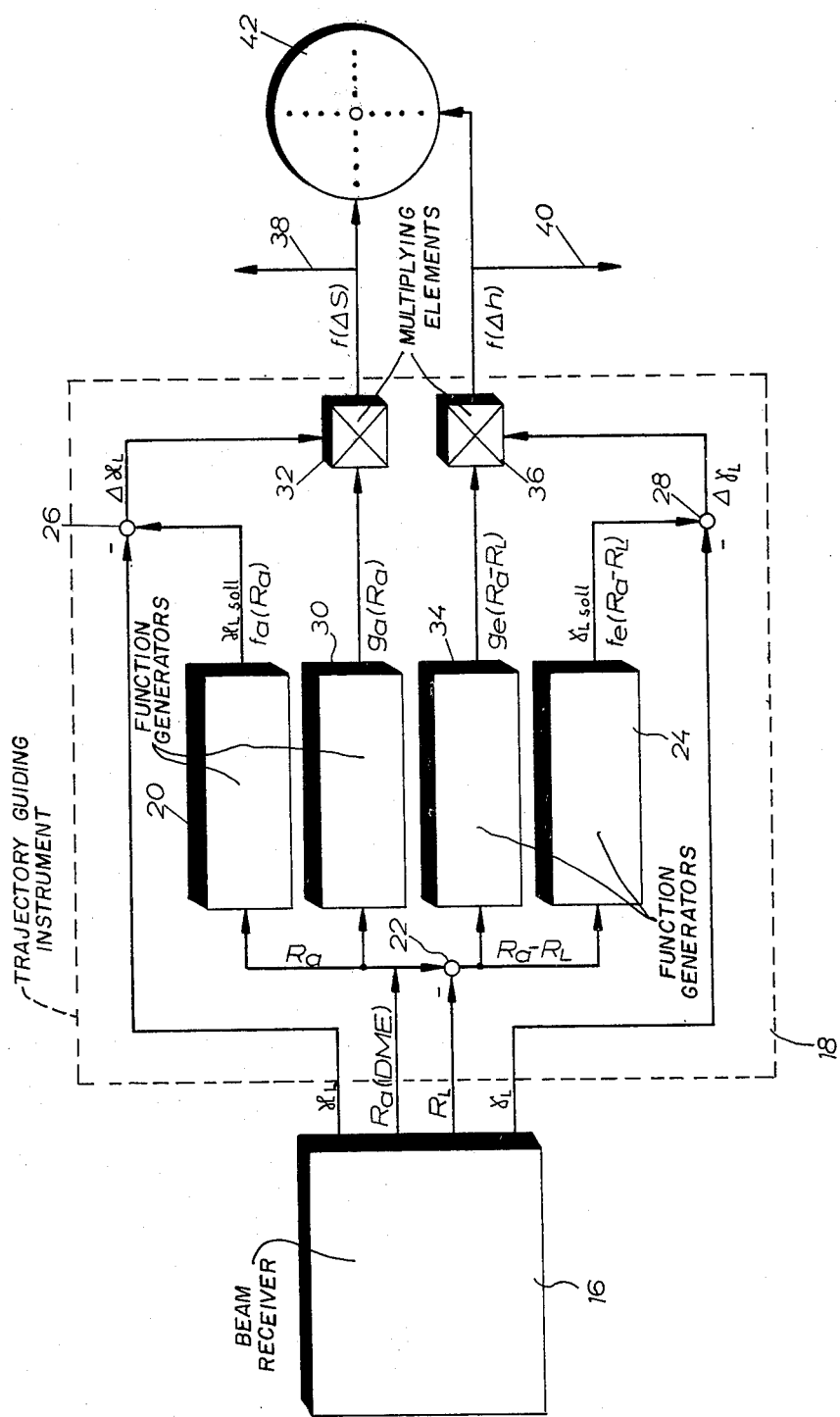
FIG. 1 is a block schematic diagram of a device for aircraft trajectory guidance incorporating the invention.

A similar result is achieved in an apparatus of FIG. 1, if the function $f_e(R_u - R_L)$ of function generator 24 is a continuous function proportional to slant distance in a range of small slant distances, constant in a median range and again proportional to slant distance, with a reduced constant of proportionality, in a range of large slant distances.

We claim:

1. In an apparatus for use in determining a desired flight path for an aircraft by using a radio beam between transmitter means at a predetermined location and a receiver on the aircraft, which receiver supplies actual signals indicative of the slant distance and of at least one angle of the aircraft from said transmitter means, said apparatus including trajectory computer means connected to said receiver to receive said slant distance signal and in response thereto to generate command signals establishing a flight path for the aircraft, which flight path includes portions which are not radial to the transmitter means, the improvement wherein said trajectory computer means comprises:

function generator means to supply, in response to said slant distance signal, a command angle signal indicative of the value of said one angle were the aircraft on a desired trajectory at said slant distance, means for comparing said command angle signal to said actual angle signal to produce an angle deviation signal for use in keeping the aircraft substantially on said desired trajectory, a second function generator means connected to receive said slant distance signals and in response thereto to supply an output signal which is a preselected function of the slant distance signal, said preselected function, at least in a range of small slant distances, increasing with increasing slant distance, and multiplying means connected to said comparing means and to said second function generator to produce a command signal as the product of the angle deviation signal and said output signal.

2. An apparatus as claimed in claim 1, wherein said preselected function of slant distance is a continuous function proportional to slant distance in a range of small slant distances, constant in a median range and again proportional to slant distance, with a reduced constant of proportionality, in a range of large slant distances.

3. An apparatus as claimed in claim 1, wherein said function generator means includes function generating means for supplying an output signal depending on said slant distance signal in accordance with a continuous function composed of at least two linear functions of said slant distance signal, each of said linear functions prevailing in an associated range of slant distance, whereby the thus determined flight path is composed of portions of parabolas, said function generator means employing said output signal in producing said command angle signal.

4. An apparatus as claimed in claim 3, wherein said function generator means includes a time element connected in series with the output from said function generating means, said time element having a transfer function of $$\frac{1}{(1+T_s)},$$

$s$ being the variable of the Laplace transform and $T$ being a time constant, whereby the transition from one parabola to the adjacent one is smoothed.

5. An apparatus as claimed in claim 3, wherein said function generator means comprises:

means for supplying a first adjustable signal, variable attenuator means connected to receive said slant distance signal, a first unit-gain summing amplifier having an input and an output, means connecting said amplifier input to said variable attenuator means and said means for supplying said first adjustable signal, a second unit-gain summing amplifier having an input and an output, means for supplying a second adjustable signal connected to said second unit-gain summing amplifier, means connecting the input of said second amplifier to the output of the first amplifier, means including a first controlled electronic switch means connecting the input of the second amplifier to said variable attenuator means and to said means for supplying said second adjustable signal, a second variable attenuator means connected to receive the slant distance signal, means for supplying a third adjustable signal, a third summing amplifier having an input and an output, means including second controlled electronic switch means connecting the input of the third amplifier to the output of the second amplifier, means including third controlled electronic switch means connecting the input of the third amplifier with said second variable attenuator means and to said means for supplying said third adjustable signal, means for supplying a first adjustable reference distance signal, first comparator means having an input and an output, means connecting said comparator input to receive said slant distance signal and to said means for supplying said reference distance signal, means connecting said comparator output to said first switch means, second comparator means having an input and an output, means for supplying a second adjustable reference signal, means connecting the input of the second comparator means to receive the slant distance signal and to said means for supplying the second adjustable reference signal, and means connecting the second comparator means and the second and third controlled electronic switch means for controlling the latter so that one is open while the other is closed and vice versa.

6. In an apparatus for use in determining a desired flight path for an aircraft by using radio beam between the aircraft and a first transmitter means at a predetermined first location along a runway and between a second transmitter means at a predetermined second location along said runway, said apparatus including a receiver which supplies, from the radio beam from said first transmitter means, a signal indicative of the azimuth angle of the aircraft as viewed from said first location and a signal indicative of the slant distance from said first location, and, from the radio beam from said second transmitter, a signal indicative of the elevation angle of the aircraft as viewed from said second location, the improvement wherein said apparatus includes a trajectory computer comprising:

a. first function generator means connected to said receiver to receive said slant distance signal and in response thereto to supply a command azimuth angle signal indicative of the value of said azimuth angle, under which the aircraft would be viewed from said first location if it were at said slant distance from said first location on said desired flight path, b. means connected to said function generator means and said receiver for comparing said command azimuth angle signal to said actual azimuth angle signal from said apparatus to produce an azimuth angle deviation signal, c. second function generator means connected to said receiver to receive said slant distance signal and in response thereto to supply a first output signal which is a first preselected function of said slant distance signal, said function at least in a range of small slant distances, increasing with increasing slant distance signal, d. first multiplying means connected to said azimuth comparing means and to said second function generator to produce an azimuth output signal indicative of the product of said azimuth angle deviation and said first preselected function for guiding the aircraft laterally along said desired flight path, e. difference forming means connected to said receiver for forming a difference signal from said slant distance signal and a signal indicative of the distance between said first and second locations, said difference signal being approximately indicative of the slant distance of the aircraft from said second location, f. third function generator means connected to said difference forming means to receive said difference signal and in response thereto to supply a command elevation angle signal indicative of the value of said elevation angle, under which the aircraft would be viewed from said first location, if it were at said slant distance from said second location on the desired flight path, g. means connected to said receiver and said third function generator means for comparing said command elevation angle signal to said actual elevation angle signal from said receiver to produce an elevation angle deviation signal, h. fourth function generator means connected to said difference forming means to receive said difference signal and in response thereto to supply a second output signal which is a second preselected function of said difference signal, the latter function, at least in a range of small difference signals, increasing with increasing difference signals, and i. second multiplying means connected to said elevation angle comparing means and to said fourth function generator means to produce an elevation output signal indicative of the product of said elevation angle derivation and said second preselected function for guiding the aircraft vertically along said desired flight path.

7. In an apparatus for use in determining a desired flight path for an aircraft by using a radio beam between transmitter means at a predetermined location and a receiver on the aircraft, which receiver supplies actual signals indicative of the slant distance and of at least one angle of the aircraft from said transmitter means, said apparatus including trajectory computer means connected to said receiver to receive said slant distance signal and in response thereto to generate command signals establishing a flight path for the aircraft, which flight path includes portions which are not radial to the transmitter means, the improvement wherein said trajectory computer means comprises:

function generator means to which said slant distance signal is applied and which supplies a command signal analogue to a co-ordinate of said desired flight path associated with the slant distance corresponding to said slant distance signal, and means for deriving, at least in a predetermined range of slant distances, from said slant distance signal and said angle signal and said command signal, a deviation signal indicative of the deviation, in terms of transverse travel, of the aircraft from said desired flight path, said deriving means comprising multiplying means for multiplying angular information by a function of slant distance.

8. In an apparatus as set forth in claim 7, wherein said co-ordinate is an angle in a predetermined plane at which the aircraft would be viewed from said transmitter means at said associated slant distance from the transmitter means, if it were on said desired flight path.

9. In an apparatus as set forth in claim 8, wherein said angle is the elevation angle.

10. In an apparatus as set forth in claim 8, wherein said angle in the azimuth angle.

11. In an apparatus as set forth in claim 8, wherein said command signal is generated by said function generator means in accordance with a function of said slant distance signal, said function having different linear characteristics at three successive ranges and being constant in the median of said ranges.

12. In an apparatus for use in determining a desired flight path for an aircraft by using a radio beam between glide path transmitter means at a predetermined location and a receiver on the aircraft, which receiver supplies actual signals indicative of the slant distance and of the elevation angle of the aircraft from said transmitter means, said apparatus including trajectory computer means connected to said receiver to receive said slant distance signal and in response thereto to generate command signals establishing a flight path for the aircraft, which flight path includes portions which are not radial to the transmitter means, the improvement wherein said trajectory computer means comprises:

function generator means to which said slant distance signal is applied and which supplies a height command signal analogue to the height of said desired flight path associated with the slant distance corresponding to said slant distance signal, multiplying means connected to said receiver to receive both said slant distance signal and said elevation angle signal to supply a radio beam signal indicative of aircraft actual height, and means for deriving, from said height command signal and said actual height signal, a deviation signal indicative of the deviation, in terms of lateral travel, of the aircraft from said desired flight path.

13. In an apparatus as set forth in claim 12:

an integrator connected to said multiplying means to receive said radio beam actual height signal, and having an output circuit a barometric altimeter adapted to supply a barometric altitude signal, a summing amplifier having an output and connected to said barometric altimeter and to said integrator output circuit to supply at said output a corrected actual height signal, and means for applying said corrected actual height signal to said integrator in opposition to said radio beam actual height signal, said deriving means being connected to said function generator means and said summing amplifier output to form the difference between said corrected actual height signal and said height command signal.

14. In an apparatus as set forth in claim 13, wherein said integrator output circuit comprises low-pass filter means.

15. In an apparatus as set forth in claim 12, wherein said function generator means comprises:

a. multiplying means having two inputs, which are both connected to said receiver means to receive said slant distance signal, and an output, whereby said multiplying means supply a distance-squared signal indicative of the square of slant distance at said output, b. a first adjustable attenuator means connected to said receiver means to receive said slant distance signal and to attenuate it by a first adjustable factor, a second adjustable attenuator means connected to said multiplying means output to receive said distance-squared signal and to attenuate it by a second adjustable factor, and first summing means for adding said attenuated slant distance and distance squared signals to produce a fist output signal, c. a fixed signal source providing a fixed signal d. a third adjustable attenuator means connected to said fixed signal source to receive said fixed signal and to attenuate it by a third adjustable factor, a fourth adjustable attenuator means connected to said receiver means to receive said slant distance signal and to attenuate it by a fourth adjustable factor, and second summing means for adding said attenuated fixed and slant distance signals to produce a second output signal, e. a fifth adjustable attenuator means connected to said fixed signal source to receive said fixed signal and to attenuate it by a fifth adjustable factor, a sixth adjustable attenuator means connected to said receiver means to receive said slant distance signal and to attenuate it by a sixth adjustable factor, a seventh adjustable attenuator means connected to said multiplying means output to receive said distance-squared signal and to attenuate it by a seventh adjustable factor with its polarity reversed, and third summing means for adding said attenuated fixed slant distance and distance squared signals to produce a third output signal, and f. means, connected to said receiver means to receive said slant distance signal and being responsive thereto, for presenting said first, second and third output signals as said height command signal in respective ones of three successive ranges of slant distance.

16. In an apparatus as set forth in claim 15:

an eighth adjustable attenuator means connected to said fixed signal source to receive said fixed signal and to attenuate it by an eighth adjustable factor, a nineth adjustable attenuator means connected to said receiver means to receive said slant distance signal and to attenuate it by a nineth adjustable factor, fourth summing means for adding said attenuator fixed and slant distance signals to produce a fourth output signal, and means, connected to said receiver means to receive said slant distance signal and being responsive thereto, for presenting said fourth output signal as said height command signal in a fourth range of large slant distances which is adjacent the range, in which said third output signal distance is presented.

17. In an apparatus as set forth in claim 15, wherein said adjustable factors are selected to make said height command signal a continuous and differentiable function of slant distance.

* * * * *

UNITED STATES PATENT AND TRADEMARK OFFICE
CERTIFICATE OF CORRECTION

PATENT NO. : 3,911,436
DATED : Oct. 7, 1975
INVENTOR(S) : Gunther Schanzer and Hartmut Heiner Bohret It is certified that error appears in the above-identified patent and that said Letters Patent are hereby corrected as shown below:

| | |
|---|---|
| In the heading: | "Überlingen (Bodensee)" should be --Überlingen/Bodensee-- "Uhldingen-Mulhofen" should be --Uhldingen-Muhlhofen-- |
| | "Überlingen (Bodensee)" should be --Überlingen/Bodensee-- |
| Col. 3, l. 31 | "the", second occurrence, should be --then-- |
| Col. 5, l. 24 | "transmiitter" should be --transmitter-- |
| Col. 6, ls. 47 and 48 | "azimuthfunction" should be --azimuth-function-- |
| Col. 7, l. 22 and 23, | "$R_e=R_a - R_L$," should be --$R_e=R_a -R_L$,-- |
| Col. 7, l. 66 | "$x_L$" should be --$x_{L1}$-- |
| Col. 8, l. 8 | " $x_L$" should be -- $y_L$-- |
| Col. 9, l. 17 | "(column 'c')" should be --(column 'e')-- |
| Col. 10, l. 9 | "through" should be --though-- |
| Col. 10, l. 49 | "$\frac{1}{1 + T_1 S}$" should be --$\frac{1}{1 + T_1 s}$-- |
| Col. 12, l. 18 | "$\gamma$" should be -- $\gamma_{Lo}$ -- |
| Col. 12, ls. 64 and 65 | "newt-works" should be --net-works-- |
| Col. 14, l. 18 | "$R < R_2$ and $R > R_3$" should be --$R < R_2$ and $R < R_3$-- |

UNITED STATES PATENT AND TRADEMARK OFFICE
CERTIFICATE OF CORRECTION

PATENT NO. : 3,911,436                                                                  Page - 2
DATED : Oct. 7, 1975
INVENTOR(S) : Gunther Schanzer and Hartmut Heiner Bohret It is certified that error appears in the above-identified patent and that said Letters Patent are hereby corrected as shown below:

Col. 14, l. 19      "(The symbol '$>$' means 'is smaller than')" should be --(The symbol "$<$" means "is smaller than")--

Col. 17, l. 34      "$\frac{1}{(1 \div T_s)}$" should be --$\frac{1}{1 + T_s}$--

Signed and Sealed this

*thirtieth* Day of *December 1975*

[SEAL]

Attest:

RUTH C. MASON
*Attesting Officer*

C. MARSHALL DANN
*Commissioner of Patents and Trademarks*